United States Patent
Ha et al.

(10) Patent No.: US 12,369,072 B2
(45) Date of Patent: Jul. 22, 2025

(54) METHOD OF CREATING QoS SYNCHRONIZATION PROTOCOL IN WIRELESS COMMUNICATION NETWORK

(71) Applicant: ELECTRONICS AND TELECOMMUNICATIONS RESEARCH INSTITUTE, Daejeon (KR)

(72) Inventors: Jeoung Lak Ha, Daejeon (KR); Yoo Hwa Kang, Daejeon (KR); Changki Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 18/532,683

(22) Filed: Dec. 7, 2023

(65) Prior Publication Data

US 2024/0107366 A1 Mar. 28, 2024

Related U.S. Application Data

(62) Division of application No. 17/483,222, filed on Sep. 23, 2021, now Pat. No. 11,895,528.

(30) Foreign Application Priority Data

Sep. 23, 2020 (KR) .......... 10-2020-0123095
Sep. 17, 2021 (KR) .......... 10-2021-0124839

(51) Int. Cl.
*H04W 28/02* (2009.01)
*H04W 28/24* (2009.01)

(52) U.S. Cl.
CPC ....... *H04W 28/0268* (2013.01); *H04W 28/24* (2013.01)

(58) Field of Classification Search
None
See application file for complete search history.

(56) References Cited

U.S. PATENT DOCUMENTS

2019/0132251 A1* 5/2019 Dao ............ H04L 69/22
2020/0187043 A1 6/2020 Xin et al.
(Continued)

FOREIGN PATENT DOCUMENTS

CN 110267312 A 9/2019
EP 3913963 A1 11/2021
(Continued)

*Primary Examiner* — Andre Tacdiran
(74) *Attorney, Agent, or Firm* — LRK PATENT LAW FIRM

(57) ABSTRACT

Provided is a method of creating a QoS flow for a time synchronization protocol in a wireless communication network. A method of creating a QoS flow for a time synchronization protocol in a wireless communication network includes: receiving, by a Session Management Function (SMF), the PTP profile information from the UE, together with at least one of a DNN, a S-NSSAI information and a session ID for a Time Sensitive Communication (TSC) service; setting, by the SMF, a PCCrule of the QoS flow for the time synchronization protocol; providing, by the SMF, the QoS flow and a SDF filter information for the QoS flow to a User Plane Function (UPF); and providing, by the SMF, the QoS flow and a QoS rule filter to an Access and Mobility Management Function (AMF).

20 Claims, 20 Drawing Sheets

(56) References Cited

U.S. PATENT DOCUMENTS

| | | | |
|---|---|---|---|
| 2020/0228220 A1 | 7/2020 | Joseph et al. | |
| 2020/0329441 A1 | 10/2020 | Ha et al. | |
| 2020/0404697 A1 | 12/2020 | Yang et al. | |
| 2021/0337421 A1 | 10/2021 | Gan et al. | |
| 2021/0399989 A1 | 12/2021 | Wang | |
| 2023/0129885 A1* | 4/2023 | Jerichow | H04L 63/20 |
| | | | 726/1 |
| 2023/0155709 A1* | 5/2023 | Speicher | H04J 3/12 |
| | | | 370/503 |
| 2023/0180349 A1* | 6/2023 | Zhu | H04W 4/06 |
| | | | 370/312 |

FOREIGN PATENT DOCUMENTS

| | | |
|---|---|---|
| KR | 10-2018-0125886 A | 11/2018 |
| KR | 10-2019-0125970 A | 11/2019 |
| KR | 10-2020-0017523 A | 2/2020 |
| KR | 10-2020-0099956 A | 8/2020 |

* cited by examiner

OC-M: Ordinary Clock Master
TC(EE): Transparent Clock in end-to-end mode
BC: Boundary Clock
TC(PP): Transparent Clock in peer-to-peer mode
OC-S: Ordinary Clock Slave

FIG. 11

| Preamble (7) | SFD (1) | DA (6) | SA (6) | Tag (4) | Type (2) | Payload (46~1500) | FCS (4) | IFG (12) |

FIG. 13

- Profile Name: 5G TSC example
- Profile Identification: 00-00-5E-00-01-00
- Domain number: 0
- Priority: 128
- BMCA type: default BMCA
- Permitted Clocks: OC, BC, E2ETC
- One-step or Two-step: One step
- Path Delay Mechanism: E2E
- Transport Mechanism: 802.3 Ethernet
- Multicast/Unicast: Multicast 01-1B-19-00-00-00
- Sync Rate: 1 per second
- Delay Req/Resp Rate: 1 per second
- Announce Rate: 1 per second

METHOD OF CREATING QoS SYNCHRONIZATION PROTOCOL IN WIRELESS COMMUNICATION NETWORK

CROSS-REFERENCE TO RELATED APPLICATIONS

This application claims priority to and the benefit of Korean Patent Application No. 10-2020-0123095 filed in the Korean Intellectual Property Office on Sep. 23, 2020, and Korean Patent Application No. 10-2021-0124839 filed in the Korean Intellectual Property Office on Sep. 17, 2021, the entire contents of which are incorporated herein by reference.

BACKGROUND OF THE DISCLOSURE

1. Field of the Disclosure

The present disclosure relates to a method of creating a QoS flow for effectively delivering a time synchronization protocol for supporting a Time Sensitive Communication (TSC) in a 5G System (5GS).

2. Description of Related Art

A 5GS supports interworking with a Time Sensitive Networking (TSN) to support a TSC. In a TSC, time synchronization of devices participating in the TSC is premised, time synchronization is performed using a time synchronization protocol, and 5GS acting as a virtual bridge for the TSC needs to effectively communicate the time synchronization protocol. However, since the time synchronization protocol corresponds to user traffic in the 5GS virtual bridge, there is a need for a method capable of efficiently delivering the time synchronization protocol by creating a QoS flow.

In a 5G, one or more QoS flows are supported for a Protocol Data Unit (PDU) session, and each QoS flow may have different traffic processing characteristics. If the QoS flow for delivering the time synchronization protocol does not satisfy the QoS level required by the time synchronization protocol, the time synchronization quality may not be satisfactory. The conventional QoS flow generation in a 5G does not automatically reflect the characteristics for time synchronization protocol delivery, so the effective operation of the time synchronization protocol cannot be guaranteed.

If the delay occurring in the delivery of the time synchronization protocol is above a certain level or the deviation of the delay occurring in the delivery of the time synchronization protocol becomes large, it is difficult to guarantee the operation of the time synchronization protocol. The time synchronization protocol has a principle of operation using the mean path delay between a master clock and a slave clock for time synchronization, if the 5GS virtual bridge on a path of the time synchronization protocol does not guarantee proper QoS, the average path delay will be out of the appropriate level or the deviation will become too large, so that the performance of the time synchronization protocol cannot be guaranteed.

The above information disclosed in this Background section is only for enhancement of understanding of the background of the disclosure, and therefore it may contain information that does not form the prior art that is already known in this country to a person of ordinary skill in the art.

SUMMARY OF THE DISCLOSURE

The present disclosure has been made in an effort to provide a method of creating a QoS flow for a time synchronization protocol in a wireless communication network having advantages of creating a QoS flow that can satisfy the QoS required by the time synchronization protocol when a master clock and slave clocks for a TSC in 5GS perform synchronization using the time synchronization protocol.

An example embodiment of the present disclosure provides a method of creating a QoS flow for a time synchronization protocol in a wireless communication network, the method may include: receiving, by a Session Management Function (SMF), a PTP profile information from a UE, together with at least one of a DNN, a S-NSSAI information and a session ID for a Time Sensitive Communication (TSC) service; setting, by the SMF, a PCCrule of the QoS flow for the time synchronization protocol; providing, by the SMF, the QoS flow and an SDF filter information for the QoS flow to a User Plane Function (UPF); and providing, by the SMF, the QoS flow and a QoS rule filter to an Access and Mobility Management Function (AMF).

According to an embodiment of the present disclosure, wherein: the setting, by the SMF, a PCCrule of the QoS flow for the time synchronization protocol, may include: using a preset PCCrule, setting, by the SMF, the PCCrule and the QoS flow for the time synchronization protocol.

According to an embodiment of the present disclosure, wherein: the setting, by the SMF, a PCCrule of the QoS flow for the time synchronization protocol may include: requesting, by the SMF, a Policy Control Function (PCF) to set a PCCrule; receiving the set PCCrule from the PCF; and using the received PCCrule, setting, by the SMF, the PCCrule and the QoS flow for the time synchronization protocol.

According to an embodiment of the present disclosure, wherein: the requesting, by the SMF, a PCF to set a PCCrule, may include: transmitting, by the SMF, the PTP profile information provided from the UE to the PCF together with the DNN, the S-NSSAI information and the session ID.

According to an embodiment of the present disclosure, wherein: the PTP profile information may be transmitted through an Announce message.

According to an embodiment of the present disclosure, wherein: the PTP profile information may include: at least one of a selection information for one-step or two-step, an information on a method to be used as a path delay mechanism and an information on a method to be used as a transport mechanism, an information on whether to use multicast or unicast, its address, and an information on the period of each PTP message.

According to an embodiment of the present disclosure, wherein: the QoS flow may include: at least one of Packet Delay Budget (PDB), Priority, Allocation and Retention Priority (ARP), and Guaranteed Flow Bit Rate (GFBR).

According to an embodiment of the present disclosure, wherein: the SDF filter and the QoS rule filter may include: at least one of a multicast address of an Ethernet for the time synchronization protocol, an ethertype of the Ethernet for the time synchronization protocol, a multicast address of IP for time synchronization protocol and a port of UDP for time synchronization protocol According to an embodiment of the present disclosure, wherein: when a QoS requirement of a PTP profile information provided from the UE is lower than a QoS requirement for the preset PTP profile, the QoS flow may be created based on the QoS requirement for the preset PTP profile.

Another embodiment of the present disclosure provides a network entity of a 5G system operating as a TSN bridge, the network entity may include: a network interface; and a processor configured to: receive a PTP profile information from a UE, together with at least one of a DNN, a S-NSSAI information and a session ID for a TSC service; setting a PCCrule of the QoS flow for the time synchronization protocol; providing the QoS flow and an SDF filter information for the QoS flow to a UPF; and providing the QoS flow and a QoS rule filter to an AMF.

Another embodiment of the present disclosure provides a method of creating a QoS flow for a time synchronization protocol in a wireless communication network, the method may include: receiving, by a SMF, a session modification request comprising ReQQoS, which is a QoS required for the QoS flow specified by PktFltr, which is Packet Filter for the time synchronization message, from a UE; setting, by the SMF, a session policy; requesting, by the SMF, a QoS flow modification for the session to the UPF; and providing, by the SMF, a QoS flow modification information for the session to an AMF.

According to an embodiment of the present disclosure, wherein: the setting, by the SMF, a session policy, may include: using a preset PCCrule, setting, by the SMF, the session policy.

According to an embodiment of the present disclosure, wherein: the setting, by the SMF, a session policy, may include: requesting, by the SMF, the PCF to modify the PCCrule; receiving the modified PCCrule from the PCF; and using the received PCCrule, setting, by the SMF, the session policy.

According to an embodiment of the present disclosure, the method further includes: when the ReQQoS and the PTP profile from the UE are higher than a QoS requirement of a PTP profile currently used in a TSN domain to which the UE belongs, performing a session modification for the sessions of other UEs using a QoS flow based on the PTP profile currently used in the TSN domain.

According to an embodiment of the present disclosure, wherein: the PTP profile information may include: at least one of a selection information for one-step or two-step, an information on a method to be used as a path delay mechanism and an information on a method to be used as a transport mechanism, an information on whether to use multicast or unicast, its address, and an information on the period of each PTP message.

Another embodiment of the present disclosure provides a network entity of a 5G system operating as a TSN bridge, the network entity may include: a network interface; and a processor configured to: receive a session modification request comprising ReQQoS, which is a QoS required for the QoS flow specified by PktFltr, which is Packet Filter for the time synchronization message, from a UE; setting a session policy; requesting a QoS flow modification for the session to the UPF; and providing a QoS flow modification information for the session to an AMF.

Another embodiment of the present disclosure provides a method of creating a QoS flow for a time synchronization protocol in a wireless communication network, the method may include: receiving, by a SMF, at least one of a DNN, a S-NSSAI information and a session ID for a TSC service not including a PTP profile information from a UE; setting, by the SMF, a PCCrule of the QoS flow for the time synchronization protocol using a PTP profile information stored in the SMF; providing, by the SMF, the QoS flow and an SDF filter information for the QoS flow to a UPF; and providing, by the SMF, the QoS flow and a QoS rule filter to an AMF.

Another embodiment of the present disclosure provides, a network entity of a 5G system operating as a TSN bridge, the network entity may include: a network interface; and a processor configured to: receive at least one of a DNN, a S-NSSAI information and a session ID for a TSC service not including a PTP profile information from a UE; setting a PCCrule of the QoS flow for the time synchronization protocol using a PTP profile information stored in the network entity; providing, by the network, the PCCrule to the SMF; providing, by the SMF, the QoS flow and an SDF filter information for the QoS flow to a UPF; and providing, by the SMF, the QoS flow and a QoS rule filter to an AMF.

BRIEF DESCRIPTION OF THE DRAWINGS

FIG. 11 illustrates an example of an Ethernet frame according to an embodiment of the present disclosure.

FIG. 13 illustrates an example of a PTP profile according to an embodiment of the present disclosure.

DETAILED DESCRIPTION OF THE EMBODIMENTS

Figure 1:
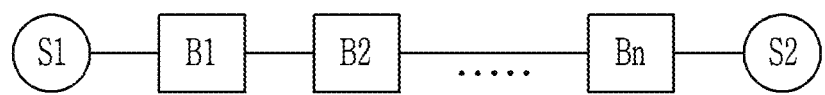
FIG. 1 illustrates a TSN bridge according to an embodiment of the present disclosure.

Hereinafter, embodiments of the present disclosure will be described in detail with reference to the accompanying drawings so that those of ordinary skill in the art may easily implement the present disclosure. However, the present disclosure may be implemented in various different ways and is not limited to the embodiments described herein. In the drawings, parts irrelevant to the description are omitted in order to clearly describe the present disclosure, and like reference numerals are assigned to like elements throughout the specification.

Throughout the specification and claims, unless explicitly described to the contrary, the word "comprise", and variations such as "comprises" or "comprising", will be understood to imply the inclusion of stated elements but not the exclusion of any other elements. In addition, terms such as " . . . unit", " . . . group", and "module" described in the specification mean a unit that processes at least one function or operation, and it can be implemented as hardware or software or a combination of hardware and software.

FIG. 1 illustrates a TSN bridge according to an embodiment of the present disclosure.

Referring to FIG. 1, the illustrated is an example in which the bridges B1, B2, . . . , Bn are connected between the TSC stations S1 and S2 of both ends. One of the stations S1 and S2 may operate as a master clock and the other may operate as a slave clock, the master clock may provide a time synchronization message, and the slave clock may synchronize its own time with the master clock by receiving the time synchronization message provided from the master clock. Unlike the one shown in FIG. 1, the bridges B1, B2, . . . , Bn between the master clock and the slave clock can be configured in various types of networks, and in any configuration, accurate time synchronization can be guaranteed only when a certain level of communication quality is guaranteed.

Figure 2:
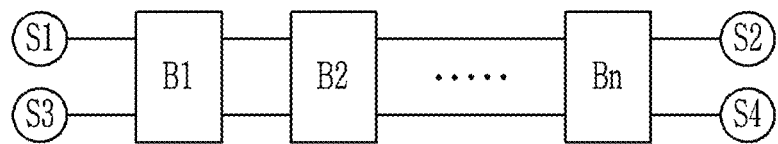
FIG. 2 illustrates a TSN bridge according to an embodiment of the present disclosure.

FIG. 2 illustrates a TSN bridge according to an embodiment of the present disclosure.

Referring to FIG. 2, in the case of multiple clocks for a TSC, the illustrated is an example in which the bridges B1, B2, . . . , Bn are connected between the TSC stations S1 and S4 of both ends. When the station S1 is the master clock and the stations S2, S3, and S4 are the slave clocks, the stations S2, S3, and S4 synchronize with the station S1.

When both the station S1 and the station S2 are the master clocks, the station S1 is selected as the master clock through the Best Master Clock Algorithm (BMCA) between them, and the station S2 does not perform the role of the master clock. In some embodiments of the present disclosure, the master clock may mean both the station S1 and the station S2, or alternatively, only the station S1 after performing BMCA.

The best master clock within one TSC domain becomes the GrandMaster Clock, and other clocks can operate as a master clock themselves by synchronizing clocks from the GrandMaster Clock.

Figure 3:
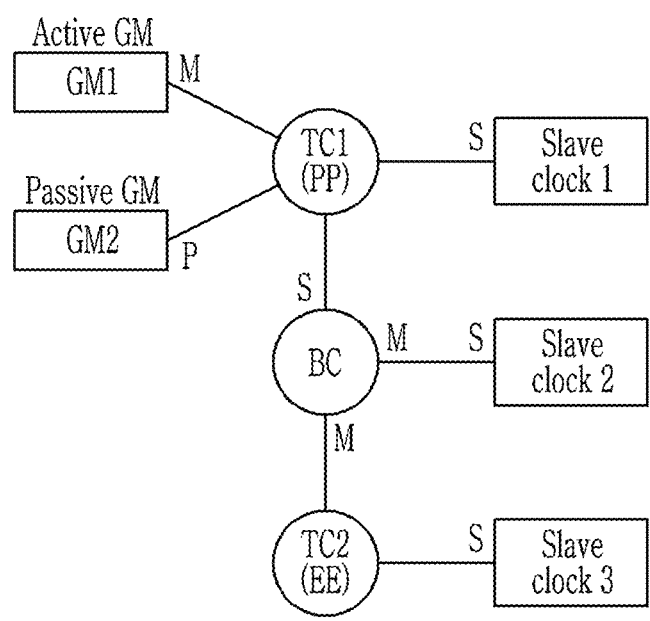
FIG. 3 illustrates an example of a master clock and a slave clock when a time synchronization protocol according to an embodiment of the present disclosure is applied.

FIG. 3 illustrates an example of a master clock and a slave clock when a time synchronization protocol according to an embodiment of the present disclosure is applied.

Referring to FIG. 3, when two master clocks GM1 and GM2 are applied, BMCA is applied between them to operate the master clock GM1 as the active master clock and the master clock GM2 as a passive master clock that does not act as a master. A boundary clock BC and a Slave clock 1 may be synchronized from the master clock GM1 via a first transparent clock TC1, a Slave clock 2 may be synchronized from the boundary clock BC, and a Slave clock 3 may be synchronized via a second transparent clock TC2. That is, the boundary clock BC may receive a time synchronization message from the master clock, become the master and provide the time synchronization message to the lower clocks again, and the transparent clock including the first transparent clock TC1 and the second transparent clock TC2 may transparently transmit the time synchronization protocol between the master clock and the slave clock. The transparent clock may operate in an end-to-end (EE) mode or a peer-to-peer (PP) mode, which will be described later with reference to FIG. 8 and FIG. 10.

Figure 4:
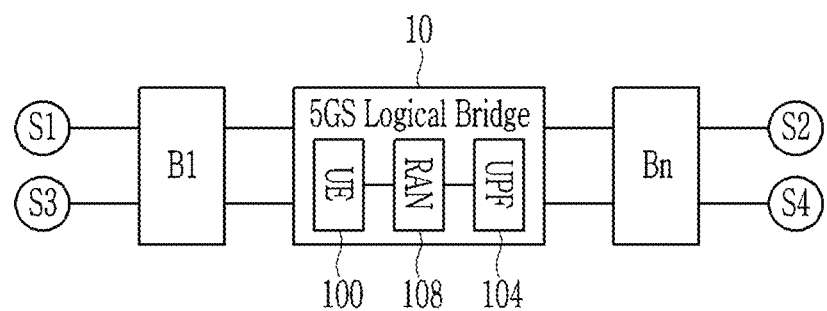
FIG. 4 and FIG. 5 illustrate an example in which a TSN bridge is configured with 5GS according to an embodiment of the present disclosure.
Figure 5:
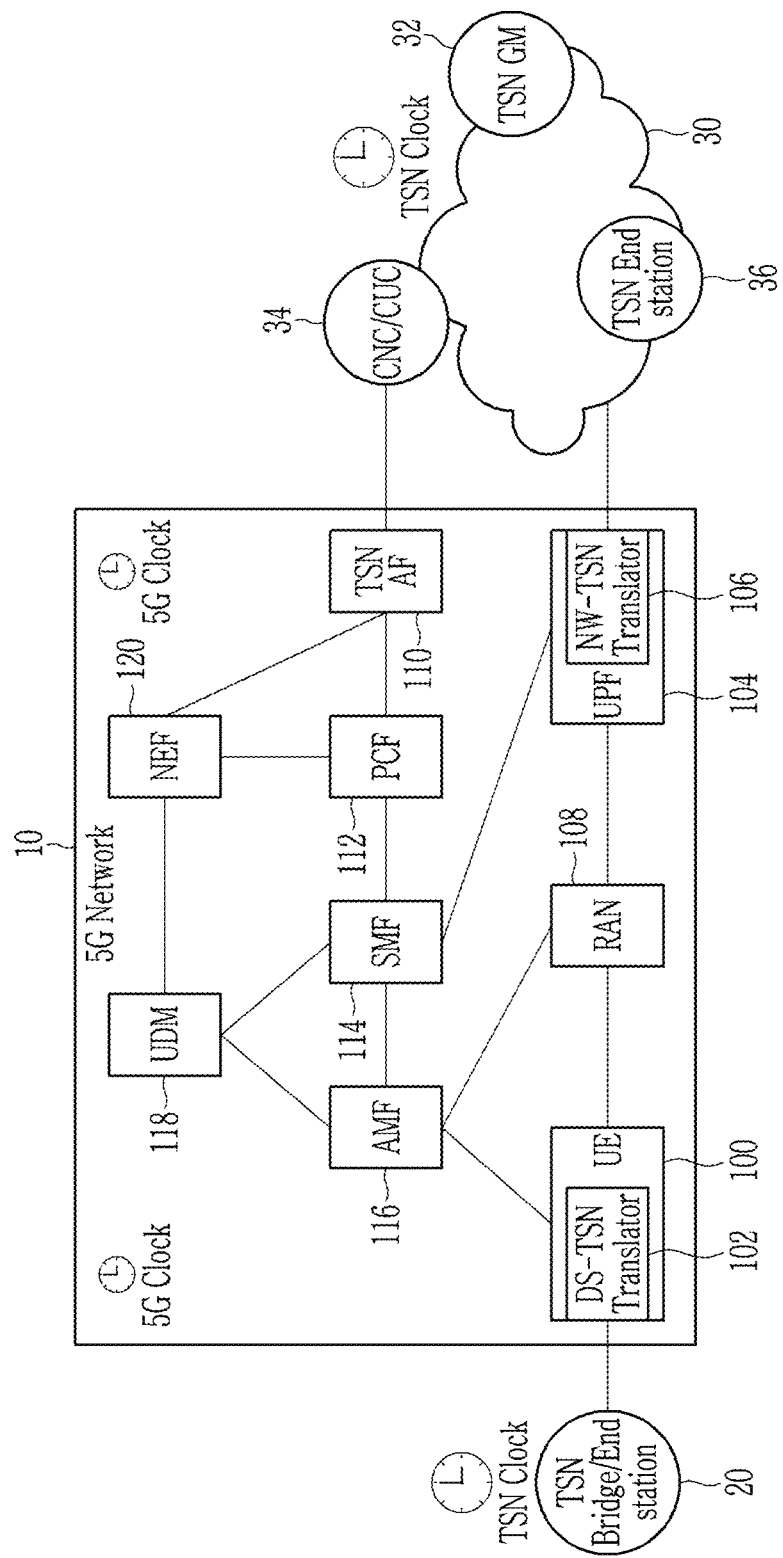

FIG. 4 and FIG. 5 illustrate an example in which a TSN bridge is configured with 5GS according to an embodiment of the present disclosure.

Referring to FIG. 4, 5GS may be applied to any of the bridges B1, B2, . . . , Bn of FIG. 1, and the 5GS bridge 10 may include a user equipment (UE) 100, a User Plane Function (UPF) 104 and Radio Access Network (RAN) 108, and the like.

Referring to FIG. 5, the illustrated is an example of a control interface of 5G TSC. When a 5G network 10 is inserted as a TSN bridge in the middle of the TSN system, translators for TSN may be required on both sides of the 5G network 10. In FIG. 5, the 5G network 10 may operate as a bridge for connecting a TSN bridge/end station 20 to the TSN system 30. The TSN system 30 may be referred to as a DN or a TSN-DN. The 5G network 10 may transmit a time synchronization information of the TSN GM 32 in the TSN-DN 30 to the TSN bridge/end station 20.

The CNC/CUC 34 may collect a topology-related information and requirements of the TSN end stations 36 in the TSN system 30, and define and command the operating characteristics of the TSN bridge and TSN end stations.

The Application Function (AF) 110 may provide the topology-related information of the 5G network 10 and the TSN bridge/end station 20 connected through the 5G network 10 to the CNC/CUC 34, and receive a command for an operation method of the 5G network 10 and the TSN bridge/end station 20 connected through the 5G network 10 from the CNC/CUC 34. AF can be replaced by the term TSN AF, which may receive the requirements for processing time sensitive data for a specific stream via a control protocol from the CNC/CUC 34 and deliver them via a Policy Control Function (PCF) 112. The PCF 112 may set a PCCrule based on the information received from the AF 100. Requirements for processing a time sensitive data may include a stream identifier (ID), a bandwidth, a maximum frame size, a frame period, and the like, for a particular stream. The AF 110 and the PCF 112 may communicate directly or communicate through a Network Exposure Function (NEF) 120 according to the network topology.

The PCF 112 may provide the topologyrelated information and PTP requirements of the 5G network 10 and the TSN bridge/end station 20 connected through the 5G network 10, received from the Session Management Function (SMF) 114, to the AF 110; may determine whether the UE 100 may be serviced with the requirements for processing the time sensitive service information from the AF 110; and may inform the SMF 114 of the determined result. The UDM 118 may manage a subscription information including a time sensitive service subscribed by the UE 100 in the 5G network 10, and provide it to the Access and Mobility Management Function (AMF) 116/SMF 114. The AMF 116 may enable the UE 100 to access the 5G network 10, and the AMF 115 may enable the UE 100 to establish a session for the TSC in the 5G network 10.

A Network TSN Translator (NW-TT) 106 may perform conversion between the 5G network 10 and the TSN system 30 on TSN data frames. The NW-TT 106 may exist within the UPF 104 or may exist independently outside the UPF 104. Since the 5G network 10 employs a packet processing method higher than the IP layer, and the TSN system 30 employs a frame processing method in the data link layer, the NW-TT 106 may perform conversion for different layers.

The UE 100 may be connected to the TSN bridge/end station 20 through a Device Side TSN Translator (DS-TT) 102. The DS-TT 102 may perform conversion between the traffic transmitted from the TSN system 30 and the traffic transmitted to the TSN system for the UE 100 belonging to the 5G network 10, and further perform conversion to control. The DS-TT 102 may have a role similar to AF 110 and NW-TT 106. The DS-TT 102 may exist inside the UE 100, or may exist independently outside the UE 100.

A Radio Access Network (RAN) 108 may perform radio access to the moving UE 100. The UPF 104 may perform processing on user data, and may serve as an anchor of the UE 100 for the TSN system 30 when the user moves to a range where the UPF 104 changes. Here, one or more UPFs 104 may be added between the anchor UPF 104 and the RAN 108. The NEF 120 may inform the function of the 5G network 10 to the TSN system 30, and the TSN system 30 may use the 5G network 10 based on this.

The 5G network 10 is internally time-synchronized with the 5G clock to support a TSC. The TSN system 30 and the TSN bridge/end station 20 must be time-synchronized with the TSN GM 32. For this purpose, PTP or the like may be used. When the time sensitive information received from the TSN system 30 is transmitted to the TSN bridge/end station 20, the time sensitive information is corrected by measuring a residence time required to transit the 5G network 10, and thereby synchronization with the TSN GM may be performed. In embodiments of the present disclosure, the performance of the time synchronization protocol is ensured by creating a QoS flow for the time synchronization protocol so that the 5G residence time is within a certain amount of time and the deviation is also within a certain range.

Here, the synchronized time may be expressed in including year, month, day, hour, minute, second, millisecond, microsecond, and nanosecond.

Figure 6:
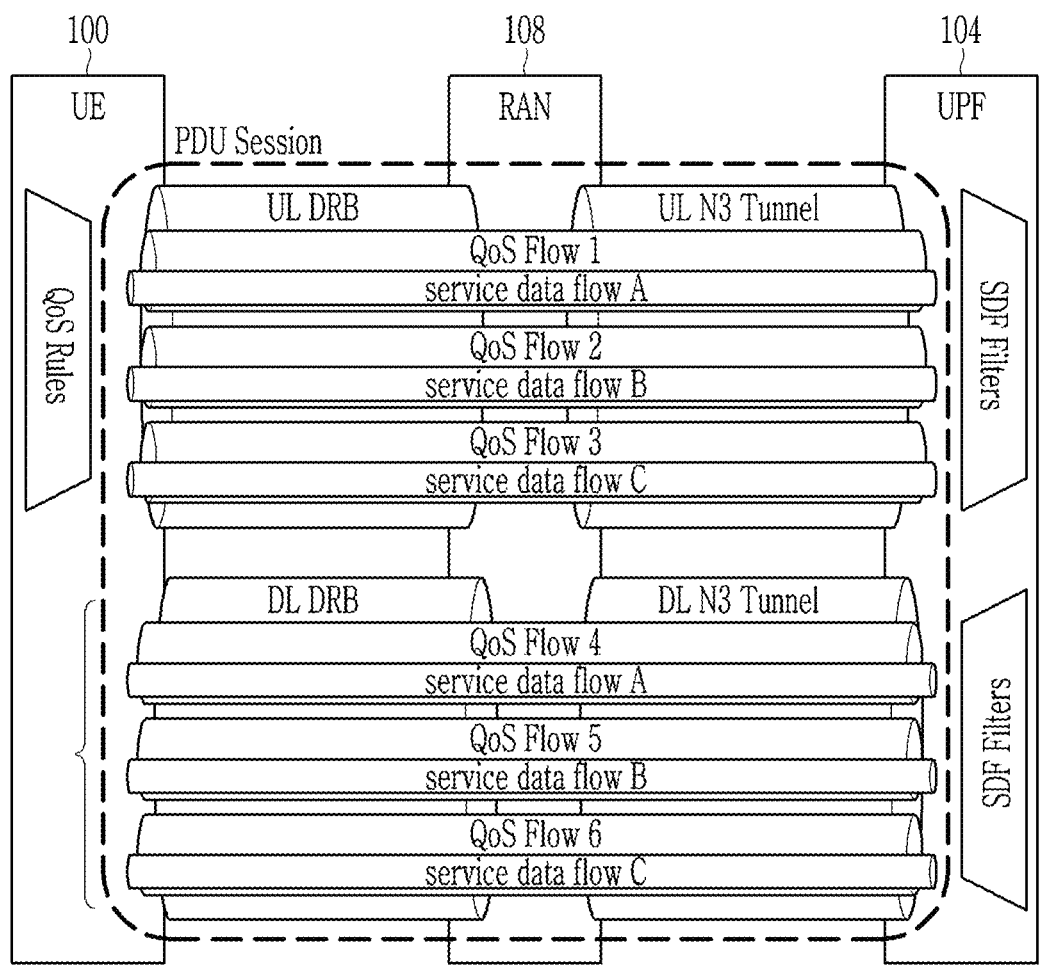
FIG. 6 illustrates a PDU session and a QoS flow in 5GS according to an embodiment of the present disclosure.

FIG. 6 illustrates a PDU session and a QoS flow in 5GS according to an embodiment of the present disclosure.

Referring to FIG. 6, a PDU session may generally include uplink (UL) and downlink (DL) data radio bearer (DRB) and GTP-U tunnels, and the GTP-U tunnel may include an N3 tunnel and an N9 tunnel. When there is no intermediate UPF between the RAN and the anchor UPF connected to the TSN system, only the N3 tunnel exists, alternatively, when there is an intermediate UPF, an N9 tunnel exists between the intermediate UPF and the anchor UPF. The QoS rules and SDF filters can be used to map user data in the form of Ethernet frames or IP packets to QoS flows.

One service data flow has one or more QoS flows, and in this case, QoS flows can be applied independently or equally for each uplink/downlink (UL/DL).

Figure 7:
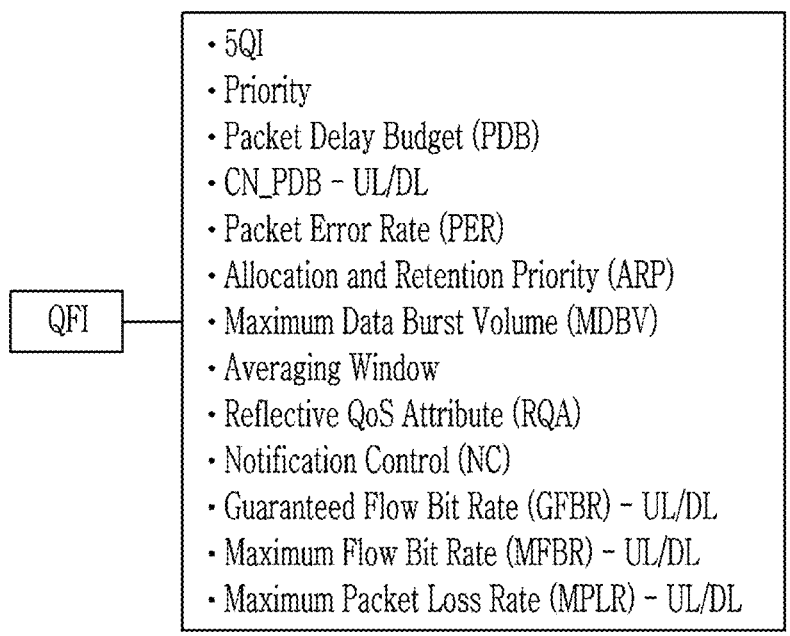
FIG. 7 illustrates properties of a QoS flow used in 5GS according to an embodiment of the present disclosure.

FIG. 7 illustrates properties of a QoS flow used in 5GS according to an embodiment of the present disclosure.

Referring to FIG. 7, a QoS Flow Identifier (QFI) is an identifier indicating a QoS flow, and is a unique value within a PDU session. Packet flows with the same QFI may receive the same QoS processing. A QoS flow represented by one QFI may be defined with various parameters.

A 5G QoS Identifier (5QI) is an identifier for a QoS flow processing method predetermined in 5G, and it is possible to change some operation characteristics for 5QI, and to define a new 5QI.

In addition, a QoS flow may be defined with properties such as Priority indicating a priority, Packet Delay Budget (PDB) indicating a delay, CN_PDB indicating a delay of the core network (see FIG. 9), Packet Error Rate (PER) indicating allowable packet error rate, Allocation and Retention Priority (ARP) indicating a pre-emption capability and a pre-emption vulnerability, Maximum Data Burst Volume (MDBV) indicating the instantaneous maximum transmission amount, Averaging Window indicating the unit time for calculating the transmission rate of GFBR/MFBR, Reflective QoS Attribute (RQA) indicating an information related to Reflective QoS application, Notification Control (NC) indicating whether to report when GFBR is not satisfied, Guaranteed Flow Bit Rate (GFBR) indicating a guaranteed transmission rate, Maximum Flow Bit Rate (MFBR) indicating a maximum transmission rate, and Maximum Packet Loss Rate (MPLR) indicating the maximum packet loss rate. Here, GFBR, MFBR, and MPLR can be set separately for uplink/downstream. In some embodiments of the present disclosure, only specific parameters may be set without setting all of the QoS flow attribute values listed above, and no separate control may be performed on unset parameters.

Uplink/downlink QoS flows may be set with the same characteristics or set with different characteristics each other.

Figure 8:
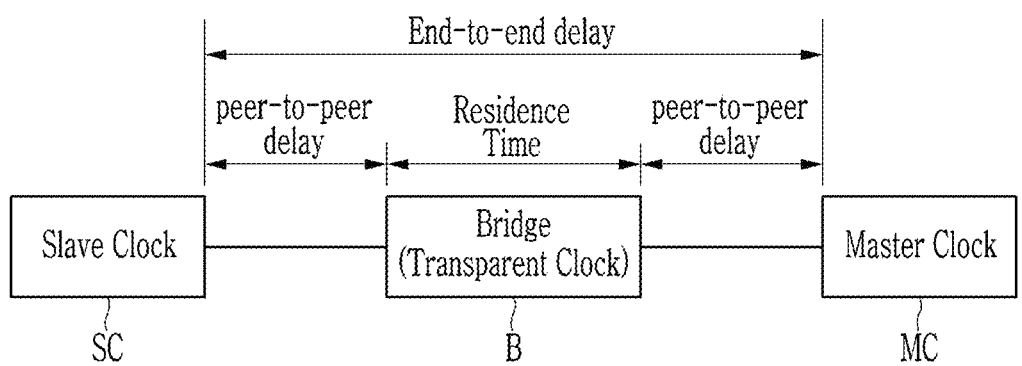
FIG. 8 illustrates a delay from a TSN GM to a TSN bridge/end station according to an embodiment of the present disclosure.

FIG. 8 illustrates a delay from a TSN GM to a TSN bridge/end station according to an embodiment of the present disclosure.

Referring to FIG. 8, delays from the TSN GM to the TSN Bridge/End stations are shown for each section, and the delay when the bridge B operates as the transparent clock TC of the PTP is shown. When the transparent clock TC operates in the end-to-end mode, the end-to-end delay is measured between the master clock MC and the slave clock SC, while when the transparent clock TC operates in the peer-to-peer mode, the peer-to-peer delay between the master clock MC and the slave clock SC, and the transparent clock TC delay may be measured and used. The transparent clock TC can be corrected by measuring the residence time in the bridge (B) when the time synchronization protocol signal from the master clock is transmitted, and the residence time and deviation must be within a certain range.

The 5GS may operate as a transparent clock to TSN.

Figure 9:
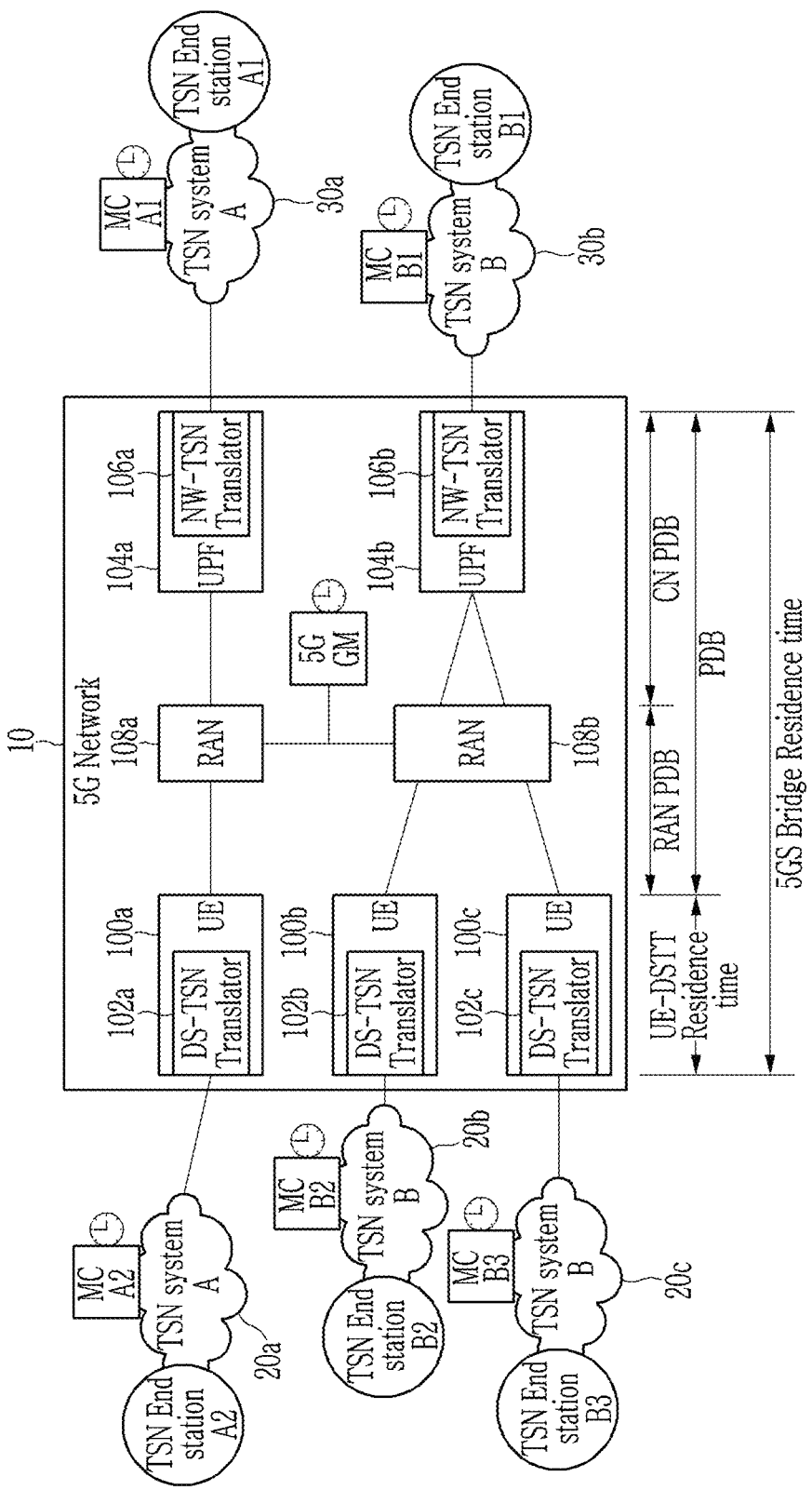
FIG. 9 illustrates a delay when a 5G network operates as a TSN bridge according to an embodiment of the present disclosure.

FIG. 9 illustrates a delay when a 5G network operates as a TSN bridge according to an embodiment of the present disclosure.

Referring to FIG. 9, the delay from the UPF 104/NW-TT 106 to the UE 100 in the 5G network 10 is a Packet Delay Bound (PDB), of which the delay from the UPF 104/NW-TT 106 to the RAN 108 is CN_PDB, and the delay from the RAN 108 to the UE 100 is RAN_PDB. The sum of RAN_PDB and CN_PDB is the PDB of the 5G network 10. The transfer time from the DS-TT 102 to the UE 100 is the UE-DSTT residence time, and the sum of the UE-DSTT residence time and the PDB is the 5G bridge residence time.

In the case of the TSN system A 20a, 30a of FIG. 9, the master clocks MC are shown as A1 and A2, respectively, but only one of them operates as the best master clock through the BMCA, and the delay in this case takes as much as the 5G bridge residence time.

In the case of the TSN system B 20b, 20c, 30b of FIG. 9, the delay when B1 operates as the best master clock through BMCA among the master clocks B1, B2, and B3 takes as much as the 5G bridge residence time. When B2 or B3 operates as the best master clock, the delay when the time synchronization protocol is delivered to the TSN end station B1 takes as much as the 5G bridge residence time, but the delay when the time synchronization protocol is delivered from the GM, which is B2 or B3, to the TSN end station B3 or the TSN end station B2 becomes (2*(5G bridge residence time)—UPF_processingdelay). Here, UPF_processingdelay is a packet processing delay in the UPF 104/NW-TT 106 and is a value included in the calculation of the CN_PDB.

Figure 10:
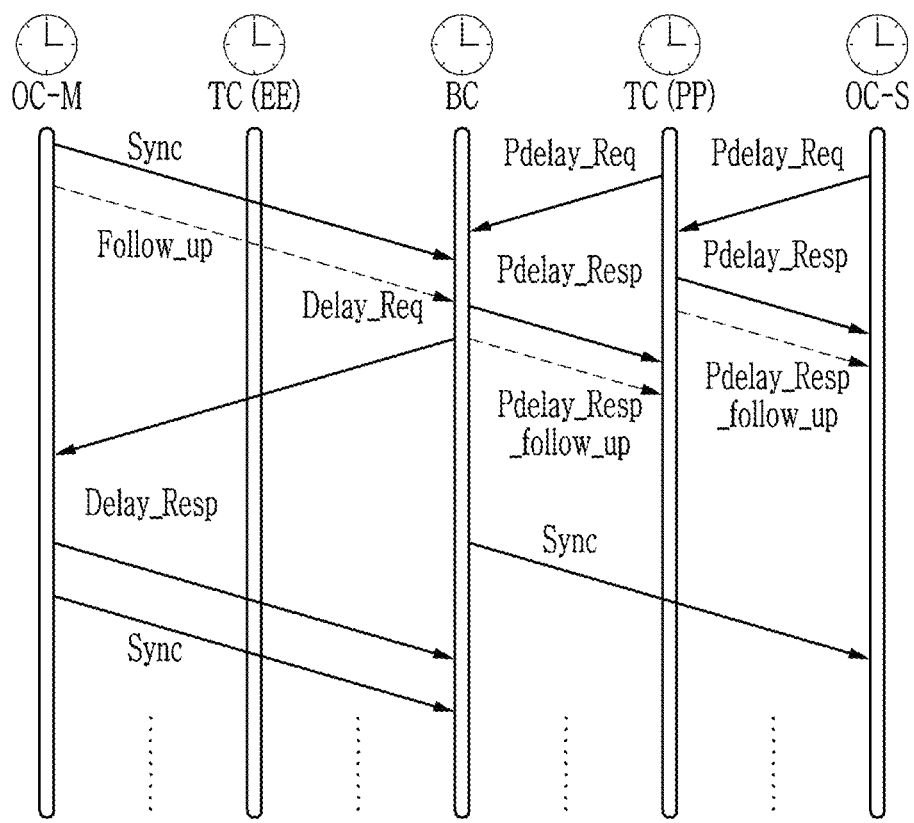
FIG. 10 illustrates an example of a PTP protocol according to an embodiment of the present disclosure.

FIG. 10 illustrates an example of a PTP protocol according to an embodiment of the present disclosure.

Referring to FIG. 10, OC-M is an ordinary clock operating as a master, and OC-S is an ordinary clock operating as a slave. BC is a boundary clock, TC (EE) is a transparent clock operating in the end-to-end mode, and TC (PP) is a transparent clock operating in the peer-to-peer mode. Usually a clock is a master clock or a slave clock with only one port. The boundary clock is a clock with more than one port, one port operates as a slave to the upper master and the other ports operate as masters. The boundary clock synchronizes with the upper master as a slave and supplies the synchronized time to other slaves as a master. One port operates as a slave to the upper master, and the other ports operate as masters. The transparent clock is a clock with more than one port and, by measuring the residence time of a PTP event message passing through the transparent clock and providing the transit time information using the PTP message, the clocks that receive the PTP message through the transparent clock may compensate for the time spent passing through the transparent clock. The transparent clock provides the end-to-end mode and the peer-to-peer mode. The transparent clock in end-to-end mode provides a transit time of the transparent clock for an end-to-end delay measurement between the master and the slave. The transparent clock in the peer-to-peer mode measures the peer-to-peer delay between the upper master and the transparent clock and provides it in addition to the transit time of the transparent clock. At this time, the slave below the transparent clock measures the peer-to-peer delay between the transparent clock and itself and uses it to compensate for its own time.

The Sync message is a packet that periodically transmits the reference time from the master to the slave, in one-step PTP, the time at which the Sync message is transmitted is recorded in the Sync message. The FollowUp message records the transmission time of the Sync message in two-step PTP and delivers it to the slave. FollowUp message is delivered at the same period as Sync message.

DelayReq/DelayResp messages are used to calculate one-way delay, and the time when the master receives the DelayReq message from the slave is recorded in the DelayResp message and delivered back to the slave. These are delivered in the same period as the Sync message. PDelayReq/PDelayResp/PDelayRespFollowUp messages are used to measure the link delay between the upper master and the transparent clock and between the transparent clock and the lower slave when the peer-to-peer transparent clock method is used. The PDelayRespFollowUp message transmits the time when the PDelayResp message is sent when two-step PTP is applied. An Announce message is a message that periodically delivers the PTP attribute of each master to determine the GM, and the GM is determined using the BMCA based on the PTP attribute of the Announce message. BMCA organizes clocks into a hierarchical structure and ensures that the slave clock uses the most accurate clock available on the network. Ports of the ordinary clock and the boundary clock that are not slave-only transmit the Announce message including attributes including clock priority and quality, and each clock in the network select the best clock to synchronize using attributes received from the BMCA and the Announce message, and determines the PTP state of each port as M, S, and P. M corresponds to a master and is a port for sending the synchronization information, S corresponds to a slave and is a port for receiving the synchronization information, and P corresponds to a passive and is port that neither sends nor receives the synchronization information. A Management message is used for network management such as monitoring, setting, and management of the PTP system. A Signaling message are used for a non-time-critical communication such as service negotiation between clocks.

PTP can operate in one-step or two-step. One-step is a method in which the time when the Sync message is transmitted from the master is directly recorded in the Sync message. Similarly, in one step, the time is directly recorded in the PDelayResp message, but in two step, the time at which the PDelayResp message is transmitted is recorded in the PDelayRespFollowUp message and delivered.

The PTP Sync, FollowUp, DelayReq, DelayResp, PDelayReq, PDelayResp, and PDelayRespFollowUp messages of FIG. 10 are transmitted periodically. Also, the Announce message is transmitted periodically. For clarity of explanation, the explanation is mainly based on the Sync message.

The syncInterval indicating the period of the PTP Sync message is expressed as an exponent of 2 using LogSyncInterval, if LogSyncInterval=0, syncInterval is 1 second, if LogSyncInterval=1, syncInterval is 2 seconds, if LogSyncInterval=−1, syncInterval is ½ second, if LogSyncInterval=−5, syncInterval is 1/32 second, and if LogSyncInterval=−7, syncInterval is 1/128 second. SyncInterval is determined according to the accuracy of the local clock of the end station and the clock accuracy required by the application of the end station.

The amount of data required for PTP may vary depending on the applied PTP profile. It is affected by various factors such as the type of transport used such as Ethernet/IPv4/IPv6, one-step/two-step PTP method, the transmission period of each message, and the size of the variable message body. Here, an example of calculation is shown based on the case of transmitting only Sync messages with LogSyncInterval=−7 through Ethernet in one-step PTP method. One-step PTP's Sync message is 118 bytes including Ethernet overhead, which is 944 bits. If it is transmitted at 128 times/sec, it will be about 120 kbps. For the slave clocks receiving the time synchronization protocol message from another master clock, in FIG. 9, when B1 provides the time synchronization messages to B2 and B3, B2 and B3 each need 120 kbps, but in case B2 provides the time synchronization message to B1 and B3 as a master, B2 needs a higher transmission rate for DelayReq/Resp from B3.

As described above, the guaranteed flow bit rate of 5G QoS required for PTP protocol transmission is determined by considering various factors such as the type of transport, one-step/two-step PTP method, and the end-to-end/peer-to-peer path delay mechanism, the Sync message, the DelayReq/Resp message, PDelayReq/Resp message, the transmission period of the Announce message, the size of the variable message, and the number of connected slave clocks, etc.

The bridge delay (residence time) required to transmit the PTP message is affected by the transmission period of the Sync message. For example, the bridge delay should be greater than or equal to 0.7*syncInterval and less than or equal to 1.3*syncInterval. Here, an example of calculating based on the case of LogSyncInterval=−7 is shown. The syncInterval becomes 1/128 second, and the requirement of the bridge delay is 5.5 ms or more and 10 ms or less. The 5G QoS PDB required for PTP protocol transmission is determined in consideration of the Sync message cycle, and a QoS flow that satisfies this transmission delay is set.

An acceptable error rate in transmitting the PTP message is affected by the accuracy of the local clock of the end station and the clock accuracy required by the application of the end station. The local clock of the end station receives the Sync message and synchronizes to the GM, and an error occurs after a certain period of time passes, and the error is overcome by receiving the next Sync message. That is, the tolerable degree of error for the Sync messages from GM is determined at the time of designing the TSC system.

FIG. 11 illustrates an example of an Ethernet frame according to an embodiment of the present disclosure.

Referring to FIG. 11, when the PTP is transmitted through Ethernet, if Ethernet preamble, Start of Frame Delimiter (SFD), the destination MAC address, the source MAC address, 802.1Q Tag, EtherType, PTP-Data, Frame Check Sequence (FCS), Inter Frame Gap (IFG) are all added up, the PTP sync message is 76 bytes in the case of configuring the PTP in two steps and 118 bytes in the case of configuring the PTP in one step.

The PTP message format included in the payload of Ethernet consists of a message header 34 bytes and a variable message body, but in the case of the Sync message, the message body is 10 bytes or 52 bytes, which is 44 bytes or 86 bytes in total. When configuring the PTP in one-step, it becomes 44 bytes, and when configuring the PTP in two-step, it becomes 86 bytes. A QoS flow that satisfies the transmission delay is set, and a required transmission rate can be obtained by multiplying the period described in relation to FIG. 10 and the size described in FIG. 11.

When transmitting PTP by Ethernet, 01-80-C2-00-00-0E or 01-1B-19-00-00-00 is used as the destination MAC address and 0x088F7 is used as the Ethertype. For the destination MAC address, 01-80-C2-00-00-0E is used for messages such as PDelayReq, PDelayResp, PDelayResp-FollowUp, etc., and 01:1B:19:00:00:00 is used for the other messages (Announce, Sync, Follow_up, Delay_Req, Delay_Resp, etc.). This information can be used as a packet filter when setting up a PCCrule.

Figure 12:
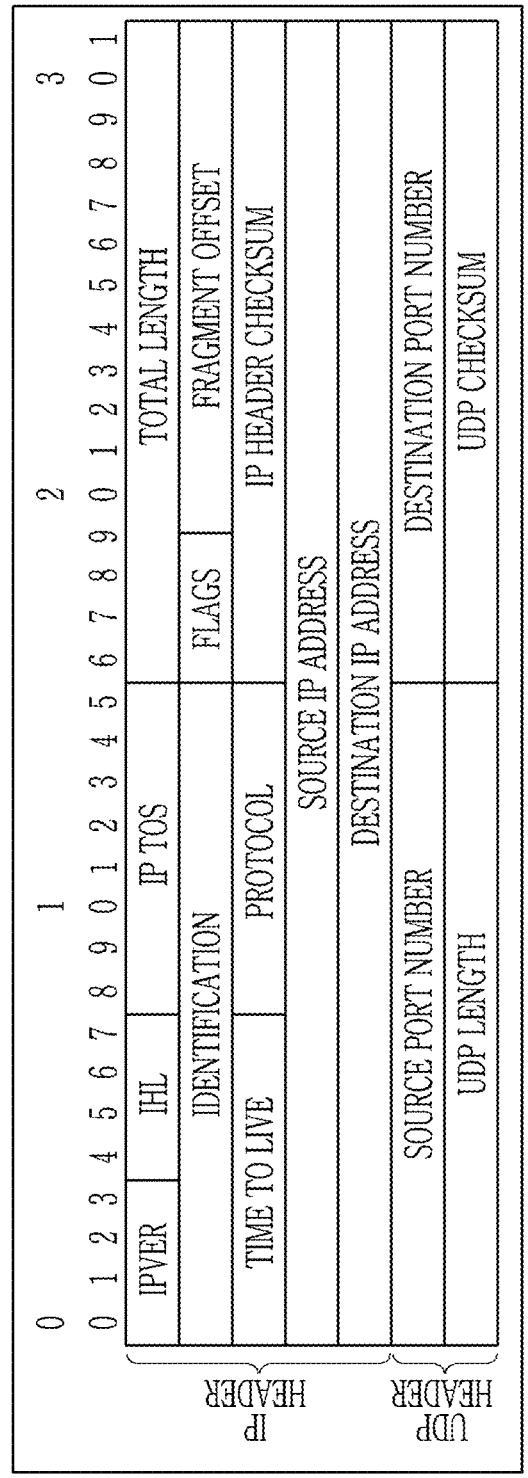
FIG. 12 illustrates an example of a UDP/IPv4 header according to an embodiment of the present disclosure.

FIG. 12 illustrates an example of a UDP/IPv4 header according to an embodiment of the present disclosure.

Referring to FIG. 12, when the PTP is transmitted using UDP/IP, 28 bytes are increased compared to when the PTP is transmitted through Ethernet. That is, in the case of the PTP Sync message, when the PTP is configured as two-step, it becomes 76+28 bytes, and when the PTP is configured as one-step, it becomes 118+28 bytes.

When transmitting the PTP using UDP/IPv4, 224.0.0.107 or 224.0.1.129 is used for the destination IP address, and 319 or 320 is used for the UDP destination port. For the destination IP address, 224.0.0.107 is used for messages such as PDelayReq, PDelayResp, PDelayRespFollowUp, etc., and 224.0.1.129 is used for the other messages (Announce, Sync, Follow_up, Delay_Req, Delay_Resp, etc.). On the other hand, depending on the PTP domain, 224.0.1.129~224.0.1.132 are used instead of the destination IP address of 224.0.1.129. For the UDP destination port, 319 is used for the event messages such as Sync, DelayReq, PDelayReq, PDelayResp, etc., and 320 is used for the other PTP general messages (FollowUp, DelayResp, PDelayRespFollowUp, Announce, Management, Signaling, etc.). As such, it can be used as a packet filter when setting up a PCCrule.

In case of transmitting PTP using UDP/IPv6, IPv6 header is 20 bytes longer than IPv4 header, so that in the case of the PTP Sync message, when the PTP is configured as two-step, it becomes 76+48 bytes, and when the PTP is configured as one-step, it becomes 118+48 bytes.

The case of transmitting the PTP using UDP/IPv6 is similar to the case of transmitting the above-described UDP/IPv4. However, FF02:0:0:0:0:0:0:6B instead of 224.0.0.107 and FF0x:0:0:0:0:0:0:181 instead of 224.0.1.129 are used as destination IP addresses. This information can be used as a packet filter when setting up a PCCrule.

FIG. 13 illustrates an example of a PTP profile according to an embodiment of the present disclosure.

Referring to FIG. 13, the PTP profile describes a profile name, an identifier, a domain number of the corresponding PTP, a priority, and a BMCA type, and includes information indicating the type of clock used. In addition, a selection information for one-step or two-step, an information on a method to be used as a path delay mechanism, and an information on a method to be used as a transport mechanism are designated. In addition, an information on whether to use multicast or unicast, an address thereof, and an information on a period of each PTP message are included.

By using the address information used for multicast/unicast, it may be applied as QoS rules and SDF filters, and the parameters of the QoS flow of FIG. 7 may be determined using one-step/two-step information, the path delay mechanism, the delivery mechanism, the message rate (Sync Rate, Delay Req/Resp Rate, Announce Rate), and the like. In some embodiments of the present disclosure, since the Announce message is less sensitive to the delivery time, it may be excluded from the calculation of the parameter setting of the QoS flow, and delivered as a Default QoS flow that is a Non-Guaranteed Bit Rate (Non-GBR).

When the UE provides the master clock, the UE or the AF has the PTP profile, and when the TSN-DN provides the master clock, the SMF, the PCF, or the AF has the PTP profile. The PTP profile is information used for the configuration and operation of the PTP, and the UE, the SMF, the PCF, and the AF may use the PTP profile as it is to generate information necessary for creating the QoS flow when necessary, or convert it into an information format required for creating the QoS flow formation and manage it.

In addition, without receiving the PTP profile from the UE, the SMF may generate a PccRule capable of supporting the PTP profile required for the TSC service through the DNN and the S-NSSAI. There may be two cases of receiving a session request including the PTP profile information together with the DNN and the S-NSSAI from the UE, or receiving a session request including only the DNN and the S-NSSAI that does not include the PTP profile information from the UE, in each of these two cases, the SMF may determine the PCCrule itself (according to the stored TSC PTP information for the DNN/S-NSSAI), or the SMF may request the PCF to set the PCCrule. When the SMF requests the PCF to set PCCrule, in determining the PCCrule, the PCF may determine the PCCrule according to the information it stores (the TSC PTP information for the DNN/S-NSSAI) or the information from the AF or the UDM.

Figure 14:
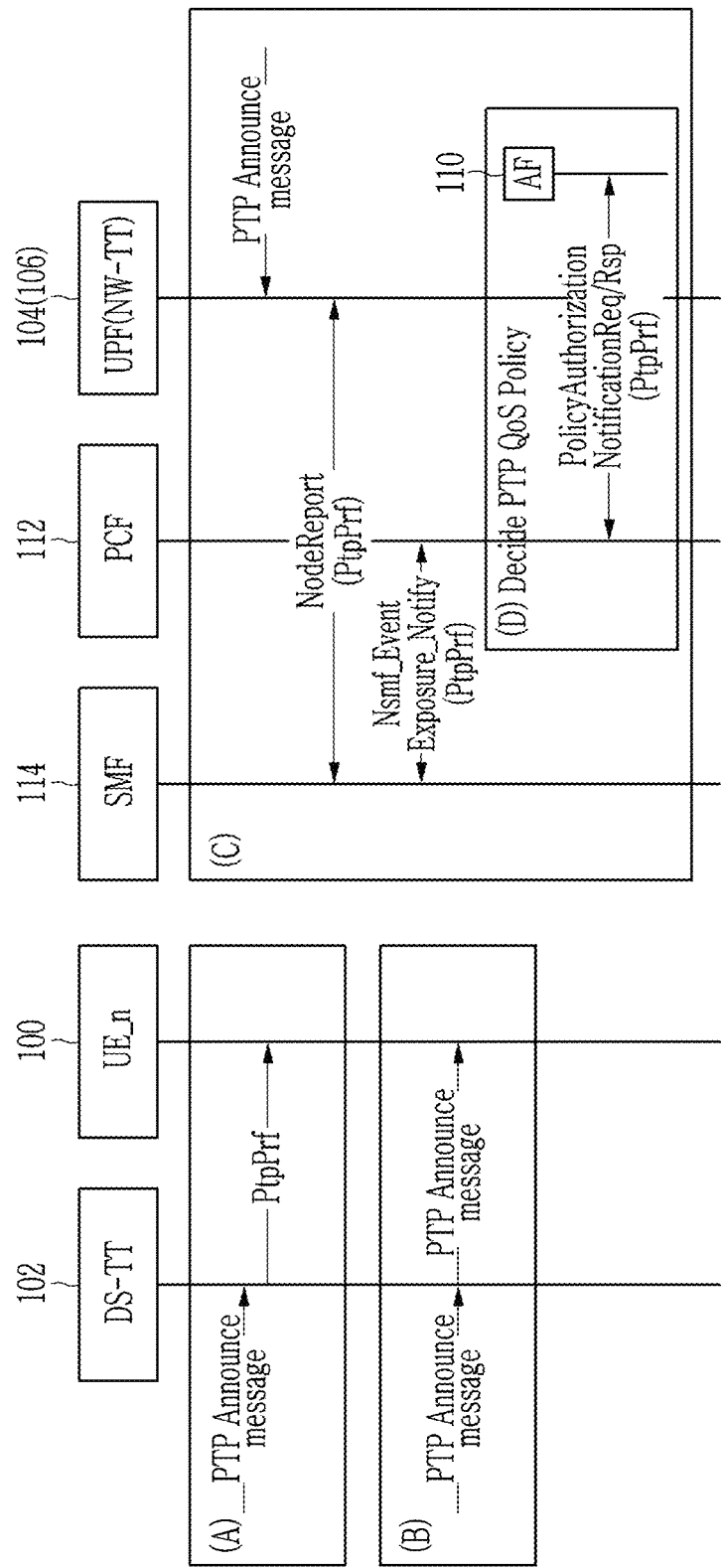
FIG. 14 illustrates obtaining a time synchronization protocol profile according to an embodiment of the present disclosure.

FIG. 14 illustrates obtaining a time synchronization protocol profile according to an embodiment of the present disclosure.

Referring to FIG. 14, acquiring a time synchronization protocol profile according to an embodiment of the present disclosure is performed through an Announce message. In the present disclosure, the time synchronization protocol profile may use a method of presetting the time synchronization protocol profile of the master clock to be used in the UE 100 to the UE 100, or may use a setting method of the UE 100 using an Announce message through the DS-TT 102. The method of presetting to the UE 100 is a method of setting the time synchronization protocol profile information of the master clock to be connected to the UE 100 to the UE 100, and a setting method of the UE 100 using an Announce message through the DS-TT 102 is possible through (A) or (B) of FIG. 14. In (A), the DS-TT 102 obtains the time synchronization protocol profile from the Announce message and provides it to the UE 100, and in (B), the UE 100 obtains the time synchronization protocol profile from the Announce message.

Similarly, the method of setting the time synchronization protocol profile in the network may use a method of setting the time synchronization protocol profile in advance in any one of the SMF 114/PCF 112/AF 110, or may a method of setting any one of the SMF 114/PCF 112/AF 110 using the Announce message through NW-TT 106 is used. In (C) of FIG. 14, the time synchronization protocol profile of the Announce message received by NW-TT 106 is transferred to the SMF 114, the SMF 114 transfers it back to the PCF 112, and the PCF 112 transfers it to the AF 110 again.

Figure 15:
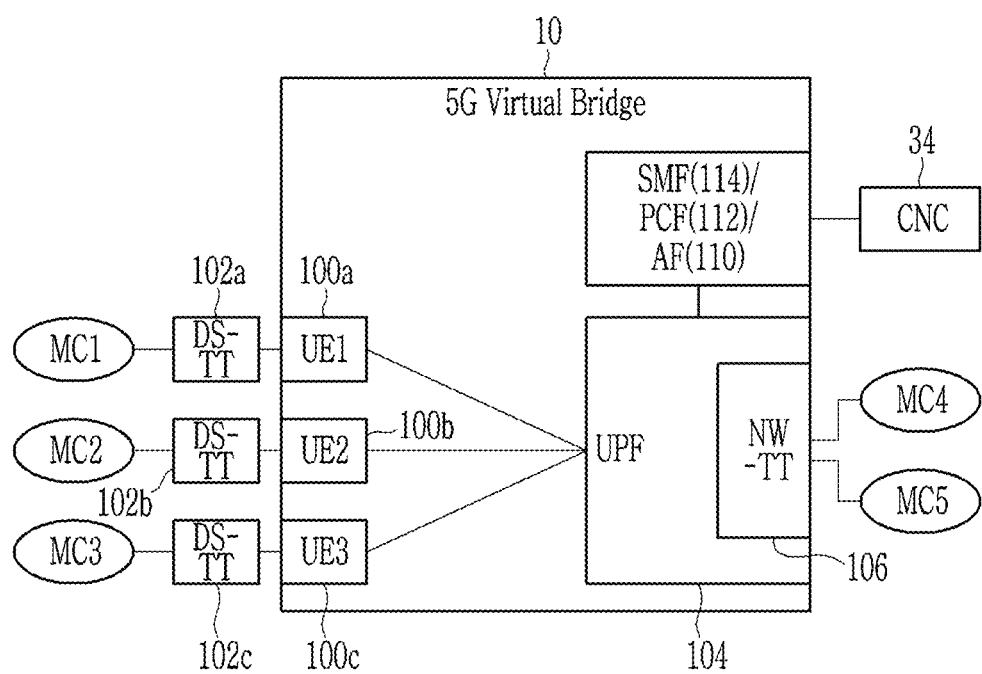
FIG. 15 illustrates a relationship between QoS requirements of a master clock profile according to an embodiment of the present disclosure.

FIG. 15 illustrates a relationship between QoS requirements of a master clock profile according to an embodiment of the present disclosure.

Referring to FIG. 15, the illustrated is an embodiment of the setting relationship of QoS requirements of the master clocks MC around the 5G virtual bridge 10. For convenience of explanation, the description will be made based on the method of presetting, not the method of setting the time synchronization protocol profile using the Announce message.

First, PtpPrf0 corresponding to the time synchronization protocol profile of the master clock MC4 is set in advance.

When the UE1 100a establishes a session for the TSC with PtpPrf_1 corresponding to the time synchronization protocol profile of the master clock MC1, the QoS flow for the time synchronization protocol to the UE1 100a is set based on the higher requirement among PtpPrf0 and PtpPrf_1. In this case, the time synchronization protocol profile for the set QoS flow may be referred to as PtpPrf0.

When the master clock MC2 is not connected to the UE2 yet, when the UE2 100b establishes a session for the TSC without an information on the time synchronization protocol profile, the QoS flow for the time synchronization protocol to the UE2 100b is set based on the requirement of PtpPrf0.

After the master clock MC2 is connected to the UE2 100b, if the QoS requirement of the time synchronization protocol profile of the master clock MC2 is higher than the requirement of PtpPrf0, the UE2 100b changes the session to set the QoS flow with the time synchronization protocol profile PtpPrf_2 of the master clock MC2. Accordingly, the QoS flow for the time synchronization protocol of the session to the UE1 100a that has been previously set will also be changed to the QoS flow that can satisfy the requirement of PtpPrf_2.

When the UE3 100c establishes a session for the TSC with PtpPrf_3 corresponding to the time synchronization protocol profile of the master clock MC3, the QoS flow for the time synchronization protocol to the UE3 100c is set based on the PtpPrf_3 which is the higher requirement among PtpPrf_2 and PtpPrf_3, and the QoS flows for the time synchronization protocol of the session to the UE1 100a and the UE3 100b that have been previously set will also be changed to the QoS flows that can satisfy the requirement of PtpPrf_3.

Now, when the master clock MC5 with a higher level time synchronization protocol profile is connected to support the master clock MC5, the SMF 114/PCF 112/AF 110 will change the QoS flow for supporting PtpPrf5, which is the time synchronization protocol profile of the master clock MC5, to a QoS flow that can satisfy the requirement of PtpPrf5 for the time synchronization protocol of each session of UE1 100a, UE2 100b, and UE3 100c.

The above example is an example of setting a QoS flow based on a higher requirement of the time synchronization protocol profile. When multiple master clocks compete, the master clock is determined through the BMCA, and in this case, the master clock is selected based on the priority, the clock class, and the clock accuracy, etc. of each clock to be the master clock. In the above example, comparing the time synchronization protocol profile is to compare the profile when it is selected as the master clock through the BMCA based on the priority, the clock class, the clock accuracy, etc. Here, BMCA includes all of a method of selecting a master clock for each port by being distributed from each clock using an Announce message, and a centralized method in which the connected clock information is transmitted to the SMF 114/PCF 112/AF 110 and compared.

Figure 16:
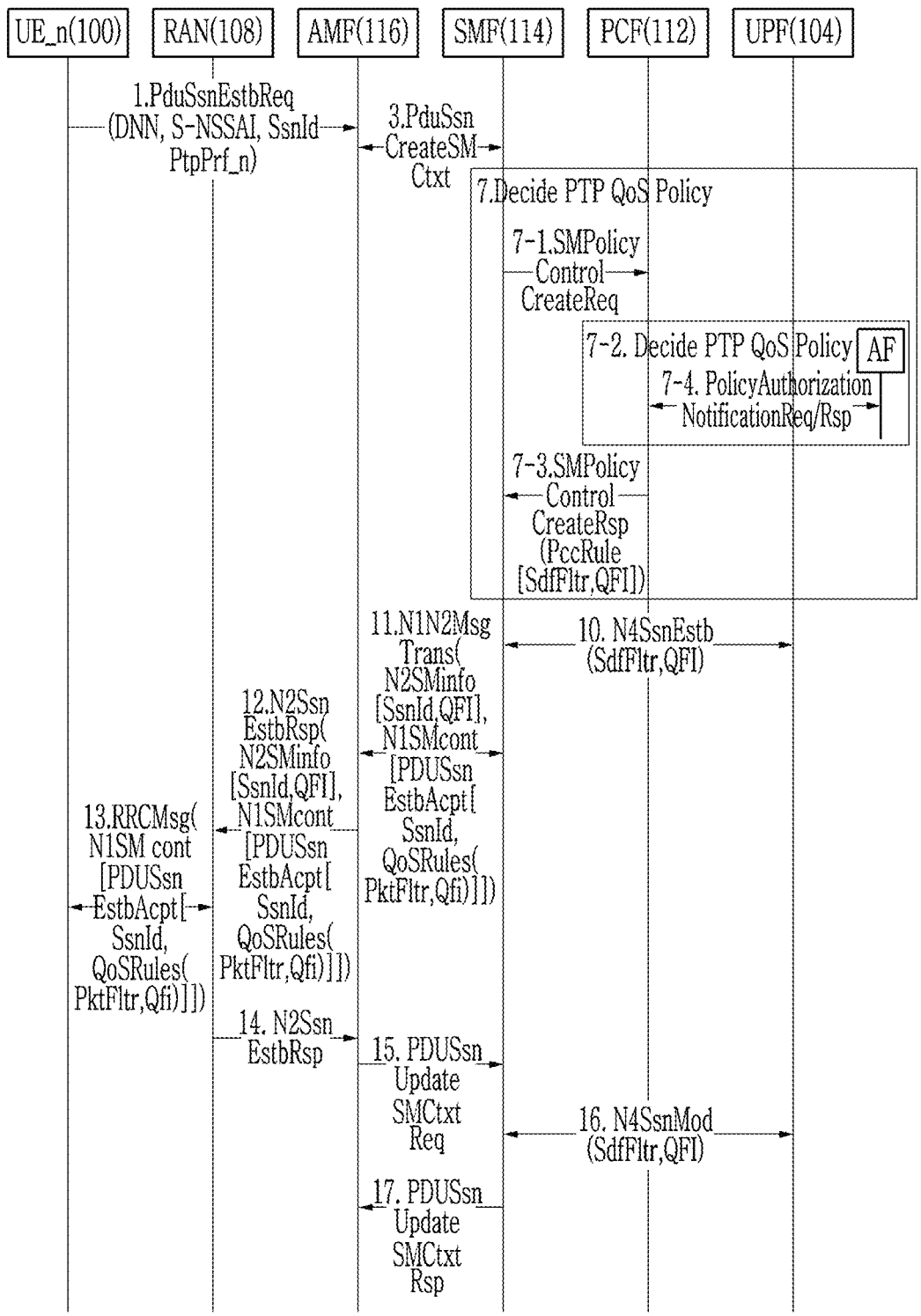
FIG. 16 illustrates a procedure for setting a QoS flow for a time synchronization protocol when establishing a PDU session according to an embodiment of the present disclosure.

FIG. 16 illustrates a procedure for setting a QoS flow for a time synchronization protocol when establishing a PDU session according to an embodiment of the present disclosure.

Referring to FIG. 16, in step 1, when the UE_n 100, which is an arbitrary n-th UE, establishes a session, a DNN and a S-NSSAI information for the TSC service are included in the PDU Session Establish Request. In this case, the ID of the session to be established and a PTP profile (PtpPrf_n of UE_n 100) information may be included together. The PTP profile is an information of the master clock to be transmitted from the UE 100 and is provided to the UE 100 through the DS-TT or the like. The time synchronization protocol profile for the master clock may be preset in the UE 100 for storage and management, or the UE 100 may store/manage the time synchronization protocol profile included in the Announce message received through DS-TT.

In step 3, the PDU Session Establish Request from the UE 100 is transferred to the SMF 114, and in step 7, the SMF 114 sets the policy of the session for the received PDU Session Establish Request. In this case, a predefined PCCrule (policy and charging control rule) preset in the SMF 114 may be used. This is a PCCrule that includes the QoS information and the packet filter information that can support the PTP profile of the DNN and the S-NSSAI that provides TSC, based on the DNN and the S-NSSAI information, it can be known that the service to the DNN and the S-NSSAI requires the TSC (preset), a QoS information (preset) for the PTP for the corresponding TSC and a packet filter information (preset) for the PTP for the TSC may be determined.

Alternatively, in step 7-1, the SMF 114 may request the PCF 112 to set a dynamic PCCrule. In this case, the SMF 114 may transmit the DNN, the S-NSSAI, the session ID, and the PTP profile information included in the PDU Session Establish Request received from the UE 100 together, and the SMF 114 allows the PCF 112 to use it to set the PCCrule as in step 7-2. This is a PCCrule that includes the QoS information and the packet filter information that can support the PTP profile of the DNN and the S-NSSAI that provides TSC, based on the DNN and the S-NSSAI information, it can be known that the service to the DNN and the S-NSSAI requires the TSC (preset a), a QoS information (preset b) for the PTP for the corresponding TSC and a packet filter information (preset c) for the PTP for the TSC may be determined, and the PCF may set the above preset (a, b, c) information in advance internally or may be acquired through AF or UDM and the like.

In step 7-3, the PCF 112 transmits the set PCCrule to the SMF 114.

Referring to step 7-4, the PCF 112 may set the PCCrule by itself, but by requesting the AF for authorization for the service to be provided to the UE 100, the PCF 112 may receive a service information for a corresponding service from the AF and apply it to PCCrule creation. In this case, the PCF 112 transmits the DNN, the S-NSSAI, the session ID, and the PTP profile information to the AF together, and receives information necessary for PCCrule setting from the AF.

When the PTP profile from the UE 100 is not provided, the PCF 112 creates a PCCrule by referring to the time synchronization protocol profile of the corresponding DN and the TSN domain provided by the DN through the DNN, the S-NSSAI, and the TSN domain.

The time synchronization protocol profile PtpPrf0 of the TSN DN specified by one or more of the DNN, the S-NSSAI, and the TSN domain may be stored and managed in the SMF 114/PCF 112/AF in advance. PtpPrf0 can be managed as a preset value, and the SMF 114/PCF 112/AF may store/manage the time synchronization protocol profile included in the Announce message received by the UPF 104 (NW-TT).

PCCrule may include information necessary to set up a QoS flow for a time synchronization protocol.

Meanwhile, if the PTP profile from the UE 100 is lower than the QoS requirement of PtpPrf0, a QoS flow may be created based on PtpPrf0.

In step 7-3 and below of FIG. 16, one or more QoS flows indicating the corresponding QoS flows are denoted by QFI. The QFI indicates attribute informations of each QoS flow as shown in FIG. 7. As the QoS flow for the time synchronization protocol, the uplink/downlink QoS flow is set respectively.

The SMF 114 determines the QoS flow by the SMF 114 itself in step 7, or determines the QoS flow based on the PCCrule received from the PCF 112, and then transmits the information to the UPF 104/RAN 108/UE 100. In addition, the PCF 112 creates a PCCrule based on the DNN, the S-NSSAI, and the TSN domain included in the UE profile received from the SMF 114, so that the SMF 114 creates a QoS flow. Also, the PCF 112 may request authorization of a service including a PTP profile when requesting service information to the AF. Alternatively, when the PTP profile is not included in the service information request of the PCF 112, the AF may provide service information on the service provided to the UE 100 to the PCF 112.

In step 10, the corresponding QoS flow and the SDF filter information for the QoS flow are provided to the UPF 104, and the QoS flow for the downlink from the UPF 104 to the RAN 108 is set to the UPF 104.

In step 16, the QoS flow for the uplink from the RAN 108 to the UPF 104 is set to the UPF 104.

In steps 11 and 12, the SMF 114 provides setting information of the QoS flow for the session to the RAN 108 through the AMF 116, and also provides the QoS rule to the UE 100 through a PDU session establish accept. This QoS rule includes a PacketFilter (i.e., a QoSRule filter) that can set a QoS flow for a time synchronization protocol and QoS parameters required therefor, and map time synchronization messages to the QoS flow.

Step 13 represents that PDU session establish accept information from the SMF 114 to the UE 100 is transferred from the RAN 108 to the UE 100. A response from the UE 100 is transmitted to the SMF 114 through steps 13, 14, and 15, and the SMF 114 receives downlink information of the corresponding QoS flow from the RAN 108 and sets it to the UPF 104 in step 16.

Figure 17:
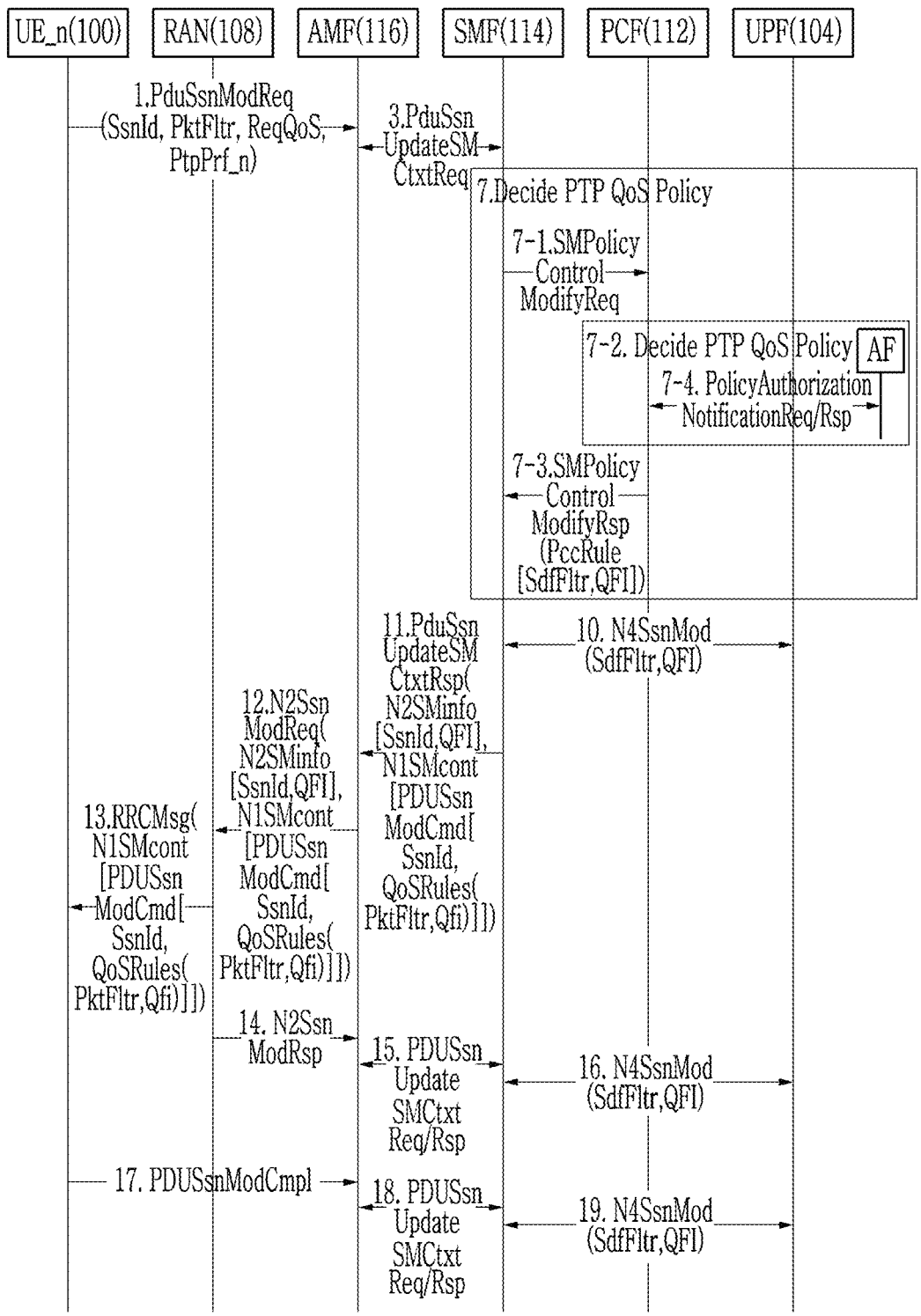
FIG. 17 illustrates a procedure for modifying a QoS flow through a PDU session modification procedure from a UE according to an embodiment of the present disclosure.

FIG. 17 illustrates a procedure for modifying a QoS flow through a PDU session modification procedure from a UE according to an embodiment of the present disclosure.

Referring to FIG. 17, when the QoS flow set in FIG. 16 cannot satisfy PtpPrf_n of the UE_n 100 or when the QoS requirement of the master clock to be transmitted from the UE 100 increases, the UE 100 may request a QoS flow modification through a session modification procedure. In this case, the QoS flow may be specified as a QoS flow having PktFltr for a time synchronization message among the PktFltr received by the UE 100 in step 13 of FIG. 16.

In step 1, the UE 100 requests a session modification including ReQQoS, which is a required QoS, for a QoS flow that can be specified by the PktFltr, which is Packet Filter for a time synchronization message. In this case, the UE 100 may request a session modification by including PtpPrf_n to be transmitted.

In step 3, the PDU Session Modify Request from the UE 100 is transmitted to the SMF 114 through the step 3, and the SMF 114 sets the session policy for the received PDU Session Modify Request. At this time, a predefined PCCrule (policy and charging control rule) preset in the SMF 114 may be used, or the PCF 112 may be requested to change the dynamic PCCrule in step 7-1. In this case, the SMF 114 may transmit the session ID, the PktFltr, the ReQQoS, and the PtpPrf_n information included in the PDU Session Modify Request received from the UE 100 together, and the SMF 114 allows the PCF 112 to use it to change the PCCrule as in step 7-2.

In step 7-3, the PCF 112 transmits the changed PCCrule to the SMF 114.

Referring to step 7-4, the PCF 112 may change the PCCrule by itself, but by requesting the AF for authorization for the service to be provided to the UE 100, the PCF 112 may receive a service information for a corresponding service from the AF and apply it to PCCrule creation. In this case, the PCF 112 transmits the session ID, the PktFltr, the ReQQoS, and the PtpPrf_n information together, and receives information necessary for PCCrule setting from the AF.

The SMF 114/PCF 112/AF can be selectively use among the ReQQoS and the PtpPrf_n.

Figure 18:
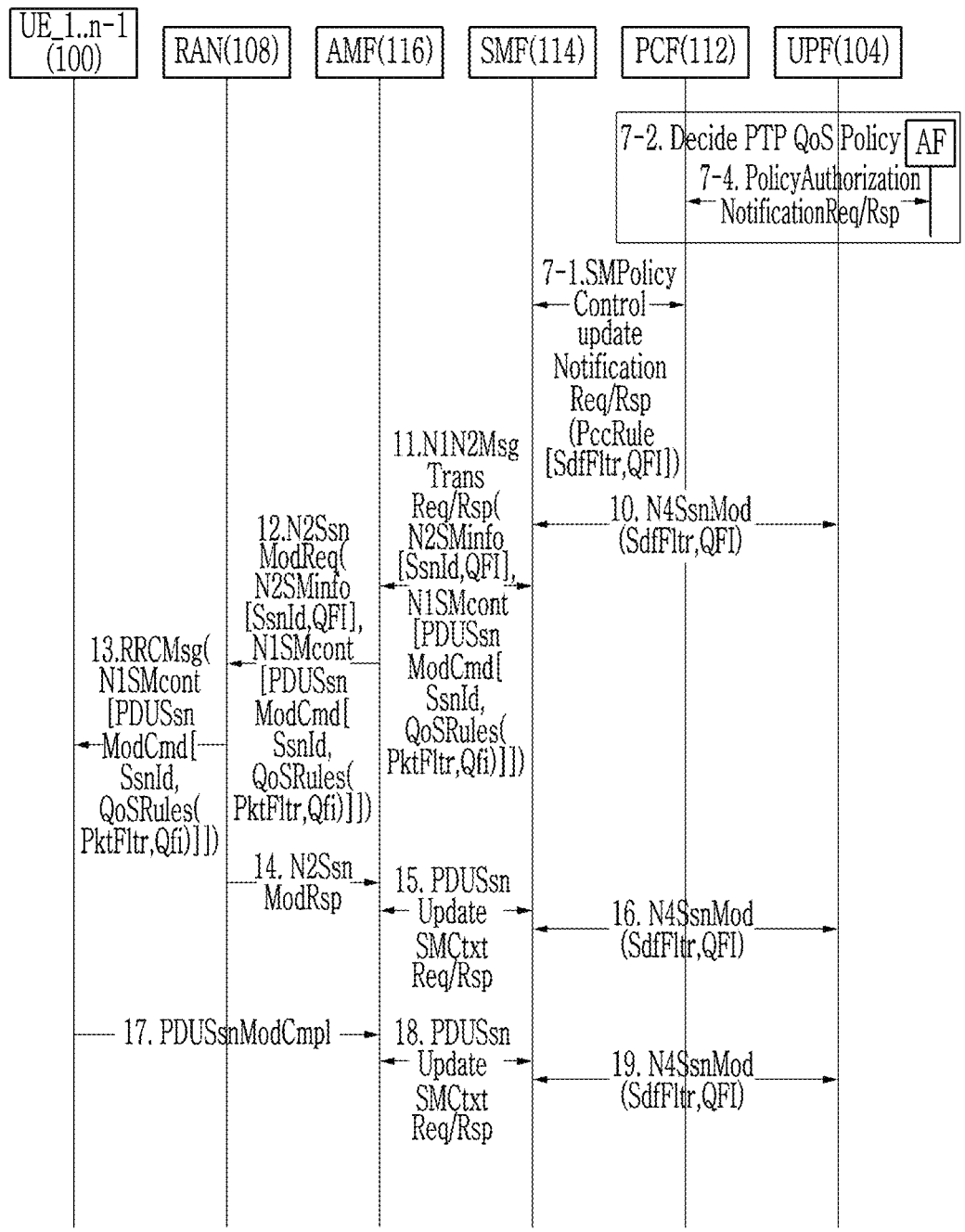
FIG. 18 illustrates a procedure for modifying a QoS flow for an existing time synchronization protocol of another UE using a PDU session modification procedure according to an embodiment of the present disclosure.

When the ReQQoS and the PtpPrf_n from the UE 100 are higher than the QoS requirement of the PtpPrf0 currently used in the TSN domain to which the UE 100 belongs, the session modification procedure of FIG. 18 must be performed for the sessions of other UEs using the QoS flow based on the PtpPrf0 currently used in the TSN domain.

The SMF 114 determines the modification of the QoS flow by the SMF 114 itself in step 7, or determines the QoS flow based on the PCCrule received from the PCF 112, and then transmits the information to the UPF 104/RAN 108/UE 100. In addition, the PCF 112 creates a PCCrule based on the session ID, the PktFltr, the ReQQoS, the PtpPrf_n and the TSN domain and the like, received from the SMF 114, so that the SMF 114 modifies a QoS flow. Also, the PCF 112 may request authorization of a service including a PTP profile when requesting service information to the AF.

In any one of steps 10, 16, and 19, the SMF 114 requests the UPF 104 to modify the QoS flow.

In steps 11 and 12, the SMF 114 provides modification information of the QoS flow for the session to the RAN 108 through the AMF 116, and also provides the QoS rule to the UE 100 through a PDU session modify command. This QoS rule includes a PacketFilter that can modify a QoS flow for a time synchronization protocol, and map time synchronization messages to the QoS flow.

Step 13 represents that PDU session modification command information from the SMF 114 to the UE 100 is transferred from the RAN 108 to the UE 100.

The response from the RAN 108 is transmitted to the SMF 114 through steps 14 and 15, and the response from the UE 100 is transmitted to the SMF 114 through steps 17 and 18.

FIG. 18 illustrates a procedure for modifying a QoS flow for an existing time synchronization protocol of another UE using a PDU session modification procedure according to an embodiment of the present disclosure.

Referring to FIG. 18, FIG. 18 is a case in which the SMF 114/PCF 112/AF detects a PTP profile having a higher requirement than the QoS requirement of PtpPrf0 currently being used for the corresponding TSN domain. FIG. 18 shows a procedure for modifying the QoS flow for the time synchronization protocol of each UE 100 being used by the SMF 114/PCF 112/AF for the TSN domain, in the case where the PtpPrf_n or the ReQQoS received from any n-th UE 100 is higher than the QoS requirement of the PtpPrf0 currently being used for the TSN domain, or in the case where the time synchronization protocol profile to be provided by the network is higher than the QoS requirement of the PtpPrf0 being used for the TSN domain. This means that the UE1 is doing a service by setting PtpPrf0 of a certain level, but when a higher level PTP needs to be serviced due to other circumstances of the UE2 or the network, the UE1 also needs to change the setting to its higher level PtpPrf_n, FIG. 19 may be referred to.

In step 7-2, when the ReQQoS and the PtpPrf_n from the UE 100 are higher than the QoS requirement of the PtpPrf0 currently used in the TSN domain to which the UE 100 belongs, the PCF 112 detects the need to modify the QoS flow for the sessions of other UEs using the QoS flow based on the PtpPrf0 currently used in the TSN domain, and modifies the PCCrule for each UE's session and informs the SMF 114 through step 7-1.

Change of PCCrule of PCF 112 is performed directly by PCF 112 or by notifying AF that PtpPrf_n of UE_n 100 is higher than existing QoS, service information related to change of PCCrule can be received from AF.

In step 7-1, after the PCF 112 notifies the SMF 114 of the PCCrule change, steps 10 to 19 are the same as described with reference to FIG. 17. However, it is applied to each of the QoS flows of each UE in the corresponding TSN domain.

Figure 19:
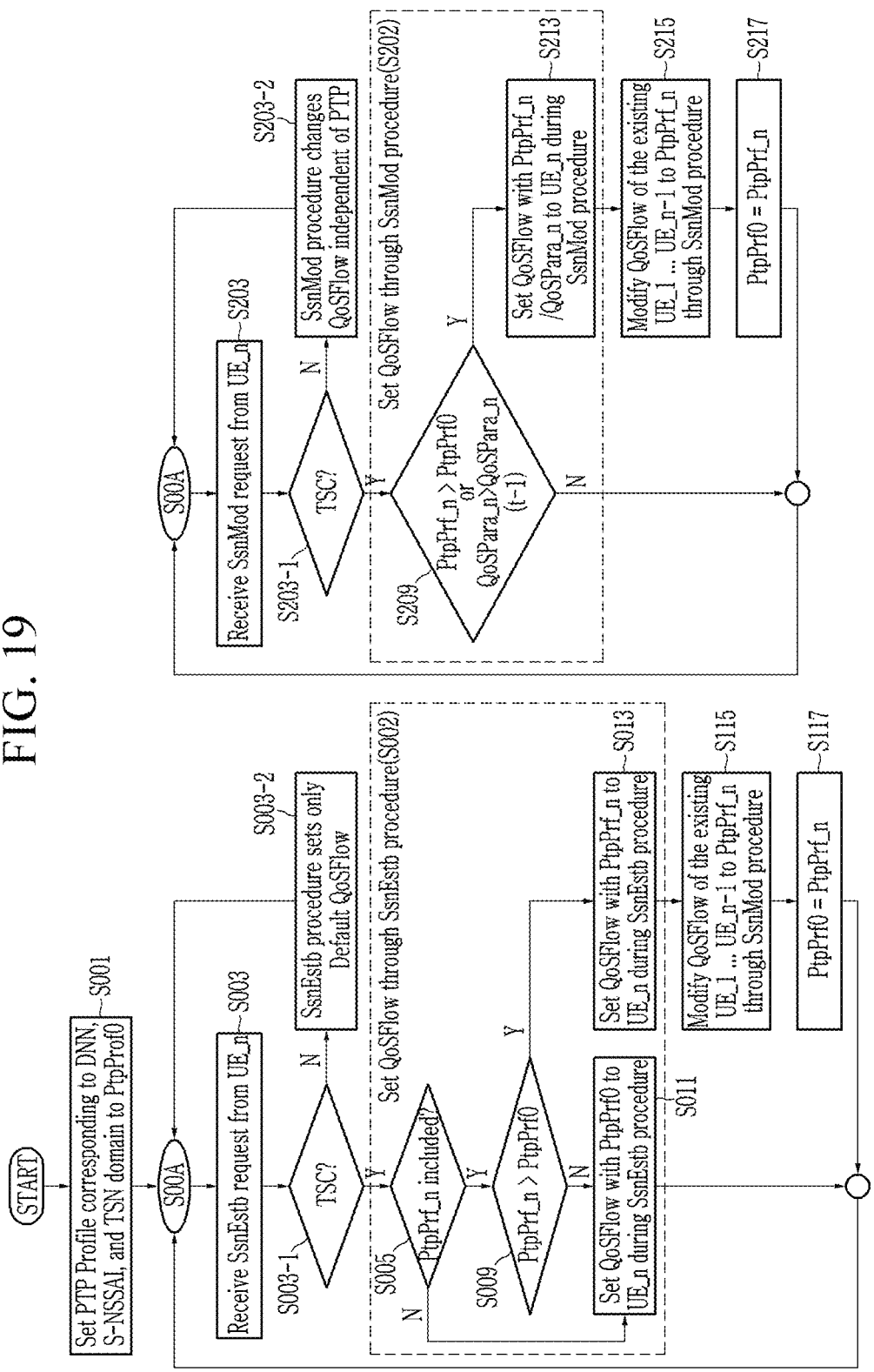
FIG. 19 illustrates a procedure for setting a QoS flow for a PDU session time synchronization protocol according to an embodiment of the present disclosure.

FIG. 19 illustrates a procedure for setting a QoS flow for a PDU session time synchronization protocol according to an embodiment of the present disclosure.

Referring to FIG. 19, FIG. 19 shows an overall flow in the 5GS for setting a QoS flow for time synchronization of a PDU session. In step S001, any one or more of the SMF/PCF/AF set the PTP profile corresponding to the DNN, the S-NSSAI, and the TSN domains as PtpProf0. In step S003, a SsnEstb, which is session establishment, request is received from an arbitrary UE, and in step S003-1, determines whether QoS flow setting is necessary for the TSC based on the DNN, the S-NSSAI and the PTP profile. At this time, in step S003-2, if there is no need to set the QoS flow for the time synchronization protocol based on the DNN and the S-NSSAI received through AMF, any one of SMF/PCF/AF sets the Non-GBR default QoS flow, and proceeds to step S00A.

In step S005, in the case of the TSC requiring the setting of a QoS flow for the time synchronization protocol, it is checked whether the PTP profile is included in the session establishment request message from the UE, and if the PTP profile is not included, a QoS flow is set with PtpPrf0 of the corresponding TSN domain in step S011. At this time, the set QoS flow can be set as a separate QoS flow, or the default QoS flow can be set by applying GBR instead of Non-GBR, or higher QoS.

If the PTP profile is included and the PTP profile from the UE (PtpPrf_n, which is the PTP profile from the nth UE, UE_n) has lower requirements than the existing PTP profile PtpPrf0 in step S009, a QoS flow of PtpPrf0 level is set in step S011.

If PtpPrf_n from the UE has a higher requirement than PtpPrf0, which is the existing PtpProfile, in step S009, a QoS flow of PtpPrf_n level is set during the session establishment procedure in step S103, the QoS flow in the PDU sessions of other UEs that are previously set using the time synchronization protocol together is changed to the level of PtpPrf_n in step S115, and PtpPrf0 is changed to PtpPrf_n in step S117. Steps S011 and S013 are also described in FIG. 16, and step S115 is also described in FIG. 17.

On the other hand, in response to the session modification request from the UE in step S203, it is checked whether the corresponding session is TSC in step S203-1, and in the case of a non-TSC session, the QoS flow is modified in a conventional manner in response to the UE's session modification request in step S203-2.

In step S209, when the QoS parameter (QosPara_n) or PtpPrf_n of the QoS flow of the UE's session modification request is higher than the current PtpPrf0 or the corresponding QoS parameter (QosPara_n(t−1), the previous QoS flow parameter of UE_n), in step S213, the QoS parameters of the QoS flow for the time synchronization protocol of the UE are modified during the session modification (SsnMod) procedure. Also, in step S115, the QoS flow in the PDU sessions of other UEs that are previously set using the time synchronization protocol of the same TSN domain is changed to the level of PtpPrf_n, and in step S117, PtpPrf0 is changed to PtpPrf_n.

Figure 20:
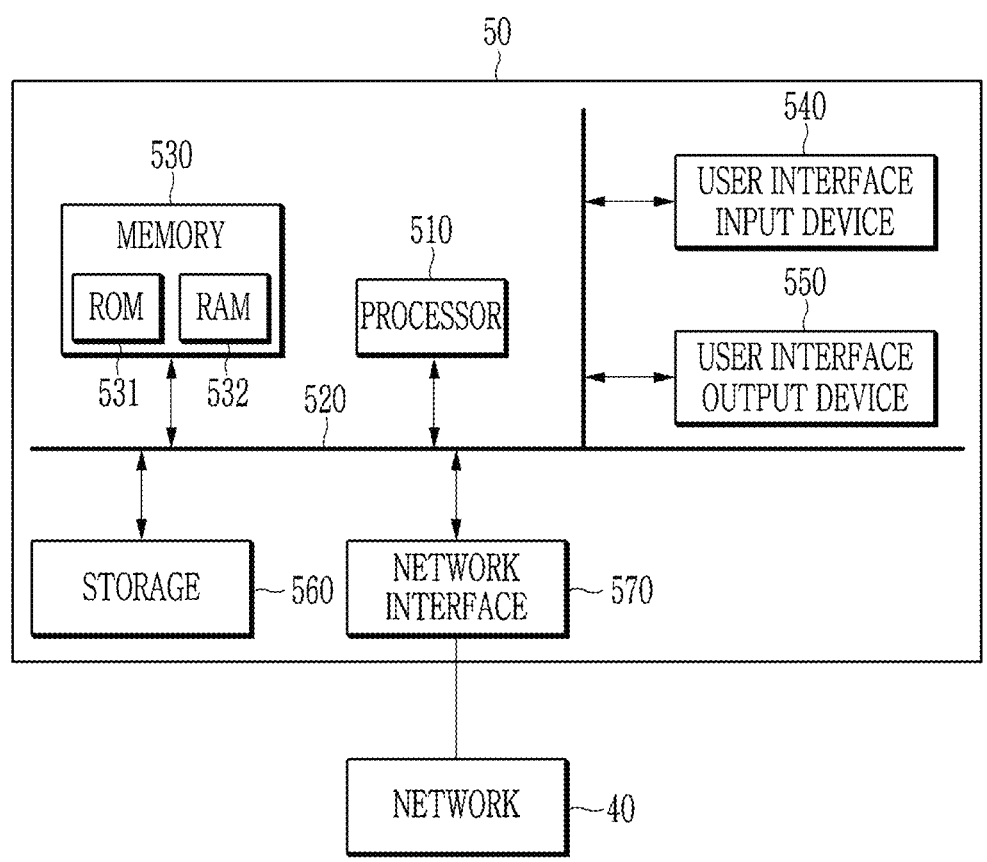
FIG. 20 is a block diagram illustrating a computing device according to an embodiment of the present disclosure.

FIG. 20 is a block diagram illustrating a computing device according to an embodiment of the present disclosure.

Referring to FIG. 20, a computing device 50 may be a network entity of a 5G system, for example, UE 100, DS-TT 102, UPF 104, NW-TT 106, RAN 108, TSN AF 110, PCF 112, SMF 114, AMF 116, UDM 118 and NEF 120, and the like. Also, a method of creating a QoS flow for a time synchronization protocol in a wireless communication network according to embodiments of the present disclosure may be implemented using the computing device 50.

The computing device 50 includes at least one of a processor 510, a memory 530, a user interface input device 540, a user interface output device 550, and a storage device 560 communicating through a bus 520. The computing device 50 may also include a network 40, such as a network interface 570 that is electrically connected to a wireless network. The network interface 570 may transmit or receive signals with other entities through the network 40.

The processor 510 may be implemented in various types such as an application processor (AP), a central processing unit (CPU), and a graphic processing unit (GPU), and may be any semiconductor device which executes instructions stored in the memory 530 or the storage device 560. The processor 510 may be configured to implement the functions and methods described in FIG. 1 to FIG. 19.

The memory 530 and the storage device 560 may include various types of volatile or nonvolatile storage media. For example, the memory may include read-only memory (ROM) 531 and random access memory (RAM) 532. In an embodiment of the present disclosure, the memory 530 may be located inside or outside the processor 510, and the memory 530 may be connected to the processor 510 through various known means.

In addition, at least some of a method of creating a QoS flow for a time synchronization protocol in a wireless communication network according to embodiments of the present disclosure may be implemented as a program or software executed on the computing device 50, and the program or software may be stored in a computer-readable medium.

In addition, at least some of a method of creating a QoS flow for a time synchronization protocol in a wireless communication network according to embodiments of the present disclosure may be implemented with hardware that can be electrically connected to the computing device 50.

According to the embodiments of the present disclosure described so far, by creating a QoS flow reflecting the PTP profile of the time synchronization protocol, and by allowing the time synchronization protocol to be processed as the corresponding QoS flow, the time synchronization quality is guaranteed and TSC can be smoothly provided.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium. A processor and a memory may be supplemented by, or integrated into, a special purpose logic circuit.

The processor may run an operating system (OS) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors.

Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

While this disclosure has been described in connection with what is presently considered to be practical example embodiments, it is to be understood that the disclosure is not limited to the disclosed embodiments. On the contrary, it is intended to cover various modifications and equivalent arrangements included within the spirit and scope of the appended claims.

What is claimed is:

1. A method of creating a Quality of Service (QOS) flow for a time synchronization protocol in a wireless communication network, the method comprising:
   receiving, by a Session Management Function (SMF), a Precision Time Protocol (PTP) profile information from a user equipment (UE), together with at least one of
      a Data Network Name (DNN),
      a Single Network Slice Selection Assistance Information (S-NSSAI), or
      a session identifier (ID) for a Time Sensitive Communication (TSC) service;
   using setting, by the SMF, a Policy and Charging Control rule (PCCrule) of a QoS flow for the time synchronization protocol;
   providing, by the SMF, the QoS flow and a Service Data Flow (SDF) filter information for the QoS flow to a User Plane Function (UPF); and
   providing, by the SMF, the QoS flow and a QoS rule filter to an Access and Mobility Management Function (AMF).

2. The method of claim 1, wherein:
   the using, by the SMF, the PCCrule of the QoS flow for the time synchronization protocol comprises:
   using a predefined preset PCCrule in the SMF, by the SMF, as the PCCrule of the Qos flow for the time synchronization protocol.

3. The method of claim 1, wherein:
   the using, by the SMF, the PCCrule of the QoS flow for the time synchronization protocol comprises:
   requesting, by the SMF, a Policy Control Function (PCF) to set a PCCrule;
   receiving the set PCCrule from the PCF; and
   using the received PCCrule, by the SMF, as the PCCrule of the QoS flow for the time synchronization protocol.

4. The method of claim 3, wherein:
   the requesting, by the SMF, the PCF to set the PCCrule comprises:
   transmitting, by the SMF, the PTP profile information provided from the UE to the PCF together with the DNN, the S-NSSAI information and the session ID.

5. The method of claim 1, wherein:
   the PTP profile information is transmitted through an Announce message.

6. The method of claim 1, wherein:
   the PTP profile information comprises:
   at least one of
      a selection information for one-step or two-step,
      an information on a method to be used as a path delay mechanism and an information on a method to be used as a transport mechanism,
      an information on whether to use multicast or unicast, a multicast or unicast address, or
      an information on the period of each PTP message.

7. The method of claim 1, wherein:
   the QoS flow comprises:
      at least one of Packet Delay Budget (PDB), Priority,
      Allocation and Retention Priority (ARP), or
      Guaranteed Flow Bit Rate (GFBR).

8. The method of claim 1, wherein:
   the SDF filter and the QoS rule filter comprises:
   at least one of a multicast address of an Ethernet for the time synchronization protocol, an ethertype of the Ethernet for the time synchronization protocol, a multicast address of IP for time synchronization protocol or a User Datagram Protocol (UDP) port number of for time synchronization protocol.

9. The method of claim 1, wherein:
   when a QoS requirement of a PTP profile information provided from the UE is lower than a QoS requirement for a predefined PTP profile, the QoS flow is created based on the Qos requirement for the predefined PTP profile.

10. The method of claim 1,
    wherein the PTP profile information comprises profile information for the PTP supported by a device side time sensitive networking translator (DS-TT) connected to a UE.

11. A network entity of a 5G system operating as a time sensitive networking (TSN) bridge, the network entity comprising:
    a network interface; and
    a processor configured to:
    receive a Precision Time Protocol (PTP) profile information from a user equipment (UE), together with at least one of
       a Data Network Name (DNN),
       a Single Network Slice Selection Assistance Information (S-NSSAI), or
       a session identifier (ID) for a Time Sensitive Communication (TSC) service;
    use a Policy and Charging Control rule (PCCrule) of a Quality of Service (Qos) flow for the time synchronization protocol;
    provide the QoS flow and a Service Data Flow (SDF) filter information for the QoS flow to a User Plane Function (UPF); and
    provide the QoS flow and a QoS rule filter to an Access and Mobility Management Function (AMF).

12. The network entity of claim 11,
    wherein, in order to use, by the SMF, the PCCrule of the QoS flow for the time synchronization protocol, the processor is configured to use a preset predefined PCCrule in the SMF, by the SMF, as the PCCrule and of the QoS flow for the time synchronization protocol.

13. The network entity of claim 11,
    wherein, in order to use setting, by the SMF, the PCCrule of the QoS flow for the time synchronization protocol, the processor is configured to:
    request, by the SMF, a Policy Control Function (PCF) to set a PCCrule, receive the set PCCrule from the PCF; and
    use the received PCCrule, by the SMF, as the PCCrule of the QoS flow for the time synchronization protocol.

14. The network entity of claim 13,
    wherein, in order to request the requesting, by the SMF, the PCF to set the PCCrule, the processor is configured to:
    transmit, by the SMF, the PTP profile information provided from the UE to the PCF together with the DNN, the S-NSSAI information and the session ID.

15. The network entity of claim 11,
    wherein the PTP profile information is transmitted through an Announce message.

16. The network entity of claim 11,
wherein the PTP profile information comprises:
  at least one of a selection information for one-step or two-step, an information on a method to be used as a path delay mechanism and an information on a method to be used as a transport mechanism, an information on whether to use multicast or unicast, a multicast or unicast address, or an information on the period of each PTP message.

17. The network entity of claim 11,
wherein the QoS flow comprises:
  at least one of Packet Delay Budget (PDB),
  Priority,
  Allocation and Retention Priority (ARP), or
  Guaranteed Flow Bit Rate (GFBR).

18. The network entity of claim 11,
wherein the S DF filter and the QoS rule filter comprises:
  at least one of a multicast address of an Ethernet for the time synichronization protocol, an ethertype of the Ethernet for the time synchronization proto a multicast address of IP for time synchronization protocol, or a port of User Datagram Protocol (UDP) for time synchronization protocol.

19. The network entity of claim 11,
wherein, when a QoS requirement of a PTP profile information provided from the UE is lower than a QoS requirement for the a predefined PTP profile, the QoS flow is created based on the QoS requirement for the predefined PTP profile.

20. A method of creating a Quality of Service (QOS) flow for a time synchronization protocol in a wireless communication network, the method comprising:
  receiving a message, by a Session Management Function (SMF) from a User Equipment (UE), including at least one of
    a Data Network Name (DNN),
    a Single Network Slice Selection Assistance Information (S-NSSAI) and
    a session identifier (ID) for a Time Sensitive Communication (TSC) service,
  wherein the message does not include Precision Time Protocol (PTP) profile information;
  selling, by the SMF, a Policy and Charging Control rule (PCCrule) of the QoS flow for the time synchronization protocol using the PTP profile information stored in the SMF;
  providing, by the SMF, the QoS flow and a Service Data Flow (SDF) filter information for the QoS flow to a User Plane Function (UPF); and
  providing, by the SMF, the QoS flow and a QoS rule filter to an Access and Mobility Management Function (AMF).

* * * * *